US008086495B2

(12) United States Patent
Ansari et al.

(10) Patent No.: US 8,086,495 B2
(45) Date of Patent: Dec. 27, 2011

(54) DEVICE AND A METHOD FOR ORDERING PRODUCT AT A PREMISES VIA AN INTEGRATED MULTIMEDIA SERVICE SYSTEM

(75) Inventors: Amir Ansari, Plano, TX (US); George A. Cowgill, Farmersville, TX (US); Leon E. Nicholls, Plano, TX (US); Jude P. Ramayya, Wylie, TX (US); Ramprakash Masina, Wylie, TX (US); Alvin R. McQuarters, Euless, TX (US); Atousa Raissyan, Potomac, MD (US)

(73) Assignee: Prodea Systems, Inc., Plano, TX (US)

( * ) Notice: Subject to any disclaimer, the term of this patent is extended or adjusted under 35 U.S.C. 154(b) by 582 days.

(21) Appl. No.: 11/898,186

(22) Filed: Sep. 10, 2007

(65) Prior Publication Data

US 2009/0070229 A1 Mar. 12, 2009

(51) Int. Cl.
*G06Q 30/00* (2006.01)
(52) U.S. Cl. ...................................... 705/26.1; 705/27.1
(58) Field of Classification Search ................... 705/26, 705/26.1–27.2
See application file for complete search history.

(56) References Cited

U.S. PATENT DOCUMENTS

| | | | |
|---|---|---|---|
| 5,991,739 A | 11/1999 | Cupps et al. | |
| 6,301,609 B1 | 10/2001 | Aravamuden et al. | |
| 6,487,646 B1 | 11/2002 | Adams et al. | |
| 6,526,581 B1 | 2/2003 | Edson | |
| 6,681,232 B1 | 1/2004 | Sistanizadeh et al. | |
| 6,735,619 B1 | 5/2004 | Sawada | |
| 6,850,901 B1 * | 2/2005 | Hunter et al. | 705/26 |
| 6,898,276 B1 | 5/2005 | Millet et al. | |
| 6,930,598 B2 | 8/2005 | Weiss | |
| 6,957,275 B1 | 10/2005 | Sekiguchi | |
| 6,961,335 B1 | 11/2005 | Millet et al. | |
| 6,965,614 B1 | 11/2005 | Osterhout et al. | |
| 7,035,270 B2 | 4/2006 | Moore et al. | |
| 7,075,919 B1 | 7/2006 | Wendt et al. | |
| 7,207,048 B2 | 4/2007 | McQuillan et al. | |
| 7,222,087 B1 | 5/2007 | Bezos et al. | |
| 2002/0023131 A1 | 2/2002 | Wu et al. | |

(Continued)

OTHER PUBLICATIONS

Technology and challenges of virtual communities. International Journal of Business Research , v 7 , n 4 , p. 69 Jul. 2007.*

(Continued)

*Primary Examiner* — Jeffrey A Smith
*Assistant Examiner* — Resha Desai
(74) *Attorney, Agent, or Firm* — Haynes and Boone, LLP

(57) ABSTRACT

A product ordering device provided at a digital home system at a user premises is disclosed. The digital home system comprises a user terminal and a gateway device within the premises. Occupants at the premises enjoy the product ordering service on an interactive user interface displayed via the user terminal. The gateway device is coupled for communication with the user terminal via a local area network, and for communication with a wide area network outside the premises; and the gateway device is configured for obtaining product data via the wide area network and providing the product data to the terminal for display on the display device. Upon placement of a product order by a user input through the terminal, the gateway device sends an order message outside of the integrated multimedia service system to request a corresponding vendor for the ordered product to deliver the ordered product at the premises. The product ordering service and the product data are provided and updated by a management server located outside of the premises.

25 Claims, 12 Drawing Sheets

U.S. PATENT DOCUMENTS

| | | |
|---|---|---|
| 2002/0059586 A1* | 5/2002 | Carney et al. .................. 725/35 |
| 2002/0124257 A1 | 9/2002 | Ismagilov |
| 2002/0128930 A1 | 9/2002 | Nakamoto et al. |
| 2002/0176404 A1 | 11/2002 | Girad |
| 2003/0083961 A1* | 5/2003 | Bezos et al. .................. 705/27 |
| 2003/0126207 A1 | 7/2003 | Creamer et al. |
| 2003/0140103 A1 | 7/2003 | Szeto et al. |
| 2003/0171996 A1 | 9/2003 | Chen et al. |
| 2003/0210770 A1 | 11/2003 | Krejcarek |
| 2004/0001480 A1 | 1/2004 | Tanigawa et al. |
| 2004/0255326 A1 | 12/2004 | Hicks et al. |
| 2005/0038875 A1 | 2/2005 | Park |
| 2005/0065855 A1 | 3/2005 | Geller |
| 2005/0108091 A1 | 5/2005 | Sotak et al. |
| 2005/0249196 A1 | 11/2005 | Ansari et al. |
| 2006/0025132 A1 | 2/2006 | Karaoguz et al. |
| 2006/0031406 A1 | 2/2006 | Watson et al. |
| 2006/0178943 A1 | 8/2006 | Rollinson et al. |
| 2006/0209857 A1 | 9/2006 | Hicks |
| 2006/0259584 A1 | 11/2006 | Watson et al. |
| 2006/0293965 A1 | 12/2006 | Burton |
| 2007/0100981 A1 | 5/2007 | Adamcyzyk et al. |
| 2007/0106570 A1 | 5/2007 | Hartman et al. |

OTHER PUBLICATIONS

International Search Report and the Written Opinion of the International Searching Authority issued in International Patent Application No. PCT/US 08/75889 dated on Nov. 24, 2008.

Intel, "Delivering on the Promise of Triple Play Digital Media", Technology Backgrounder, Consumer Electronics, © 2004, pp. 1-4.

* cited by examiner

DEVICE AND A METHOD FOR ORDERING PRODUCT AT A PREMISES VIA AN INTEGRATED MULTIMEDIA SERVICE SYSTEM

FIELD OF THE INVENTION

The present teachings relate to a system and a method for providing a product ordering service to a customer at a premises where an integrated multimedia service system is installed.

BACKGROUND

The digital home is now becoming more complex with the myriad of new and emerging digital devices intended to address many user and consumer needs such as communication, entertainment, privacy and security, etc. However, given the complexity of the emerging digital home and digital environments generally, users who are technologically challenged may find it a daunting and intimidating task to manage their home networks and interconnected digital devices. Moreover, new paradigms are emerging oriented to delivering media content to and the consuming of media content at the home. Many of these paradigms rely on communication of application specific data to and/or from the Internet, as opposed to conventional telephone or broadcast video type applications.

In practice, a customer typically subscribes to basic transport services from a network "Service Provider" (e.g. ISP—Internet Service Provider, cable provider, fixed wireless providers, ILEC—Incumbent Local Exchange Carrier, or CLEC—Competitive Local Exchange Carrier). For example, a customer may have broadband Internet access, via cable modem, digital subscriber line service or the like. Digital video service may be provided separately. The network service provider manages these basic services, at the logical network layer, typically at layers 1, 2 or 3 of the OSI model. While network services and associated devices may operate minimally at those levels, they operate at those levels only to support operations at OSI layers 1, 2 or 3. Many applications, however, involve higher level service logic for applications that view the network transport as a transparent pipe. The current internet applications delivery and management architecture, and many devices or management systems based on it, require a server with robust processing and storage capability to be located at the network operations center, not in the home. For voice over internet protocol (VoIP) type telephone service, for example, the VoIP service provider operates a session initiation protocol (SIP) server or the like, and each user has only client functionality. The network transport layers are transparent to the IP packets containing the voice and related signaling. The SIP server, however, controls the call set-up, tear-down, billing and the like for the voice call services. With such an architecture, the major capabilities and functionalities connected with providing application services from the server throughout the network reside on the server and supporting elements, all of which are located in the network operations center.

With the existing server-client (terminal) paradigm, it is currently the case that many of the application service providers also find it difficult to provide and support new emerging technologies at the home. That is, service providers are challenged to select a platform that can evolve with their applications. With existing service architectures, the launch of new services compounds complexity to the core network, adding to both capital and operating expenditures.

Thus, as new services come to the fold, often with the requirement of new equipment, e.g. integrated access devices (IADs) for VoIP and set-top boxes for streaming video, the management of the customer premises equipment (both hardware and software) complicates customer support requirements. Managing the home network environment can be an inhibitor to the adoption of new services, both from the user perspective and from the perspective of management by the service providers.

A need exists for a new paradigm, with improved convenience for the user and easier management for the application service provider. In that regard, it would be desirable to provide a multi-services application gateway device that provides not only a variety of IP-based communication services, but also offers a centralized management capability for application services.

Product transactions have become one of the popular web application services provided via the IP-based network. In a typical IP-based product transaction system, a customer accesses and buys/orders a product (or service) on a seller's server, through a PC/client. The server provides a web site interactively displayed on the PC/client which illustrates products and products-related information or lists of Hyper-Text linked product seller websites. The user of the client/PC can order the products on the interactive website provided by the server or the Hyper-Text linked product seller website. The typical IP based product transaction system, however, requires the customer to search and visit each product order website one by one. The customer has to obtain any updated product or product seller's information at each website individually. Moreover, any information or process required for payment or delivery of the products has to be entered by the customer at each transaction, typically at each different website.

These ordering services utilize the paradigm in which the server is on the network and the customer's client software runs on a PC or the like. To the extent that gateways have been proposed for customer premises deployment, the gateways have been relatively passive with respect to such eCommerce transactions. The gateway may provide security, but is not involved in the transaction interactivity.

A need exists for a product ordering service merged with a digital home system where compelling product transaction features are provided and such product information and user's information including payment and delivery are updated and managed by a third party entity outside a user's premises.

SUMMARY

The technology discussed herein may be embodied in a digital home system constructed at a premises for providing a product ordering service, for example a food ordering service, at the premises.

The teachings below encompass a system for providing a product ordering service at a user premises. The system comprises a user terminal having or driving a display device, and a gateway device in the premises. The gateway device is coupled for communication with the user terminal via a local area network, and for communication with a wide area network outside the premises. The gateway and the terminal form an integrated multimedia service system to provide a user-interactive product ordering service within the premises via the display device. The gateway device is configured for obtaining product data via the wide area network and providing the product data to the terminal to be displayed on the display device. The gateway device may obtain the product data on demand based upon a request of the terminal, or it may receive automatically without a request by the terminal. Upon a placement of a product order by a user input through the terminal based on the product data, the gateway device sends an order message outside of the integrated multimedia service system to request a corresponding vendor for the ordered product to deliver the ordered product at the premises.

In the disclosed example, a management server outside of the premises is coupled to the wide area network for communication with the gateway device. The management server authenticates associations of a plurality of terminals at one or more premises and a plurality of vendors' terminals with the management server. The management server also obtains the product data from the vendor's terminals and sends the product data to the gateway device.

The product data may be obtained by searches on the wide area network by the management server or may be supplied from the vendors' terminals. In an example, the product data comprises categorized lists of products for selective output via the display device, based on types and price of products or locations of product vendors.

The management server may also manage payment for the ordered product and integrates billing for the ordered product on a bill for providing the product ordering service at the premises.

A plurality of product vendors' terminals are coupled for communication with the management server via the wide area network. The management server, in the example, provides an interactive graphical user interface on each of the product vendors' terminals through which the vendors can input status of the ordered product and provide product data to the management server.

The gateway device may store address data of the premises and sends the address data of the premises to a vendor's terminal of the ordered product to provide a direction to the premises for use in delivery of the product while sending the order request. The gateway device may store data about the terminal user's history of orders and preferences and categorizes one or more of the lists based on the history or preferences. The user terminal in an exemplary system comprises a set top box (STB) or a digital media adapter(DMA) for converting digital data between a format used by the gateway device and a signal format for a TV type display device. A remote control associated with a TV typically provides a user input to the STB or DMA.

An application programming interface (API) is installed in the gateway device which allows application services provided on the wide area network to access functions of the gateway device for providing services to the user terminals. The application services are managed from the management server, and communications processed through the API include receiving vendors' product data and sending the order messages.

The management server may also provide an interactive graphical user interface to the user terminal through which the terminal user can input comments on processing of the order and the ordered product. The management server transmits a notification indicating status of the order to the gateway device based on processing status of the order provided from the vendor's terminal.

Another aspect of the disclosure relates to a method for providing a product ordering service to a user premises. The premises has a gateway device coupled for communication with a user terminal via a local area network in the premise and for communication with a wide area network outside the premises. The gateway and the user terminal form an integrated multimedia service system to provide the product ordering service within the premises. The gateway device is provided with product data from resources outside of the integrated multimedia service system. The product data is displayed from the gateway on the user terminal via interactive graphical user interface whereupon the user inputs an order request for a product based on the product data. The gateway receives the order request of a product from the terminal, and sends order request to a vendor's terminal corresponding to the ordered product together with terminal user's data, via the wide area network.

Another aspect of the disclosure is a gateway device for operation at a user premises to support a product ordering service. The gateway device comprises a first interface for enabling bi-directional communications within the premises, with a user terminal device within the premises, a second interface for enabling bi-directional communications for the terminal device via a wide area network, a processor coupled to the interfaces, storage coupled to the processor, and programming in the storage for the product order service. Execution of the programming by the processor causes the gateway device to provide functions in relation to the product ordering service for the terminal device. The functions include an application server communication with a client functionality of the terminal device, for the product ordering service, communicated via the first interface, and application communication via the second interface, to obtain selected product related information for communication to the terminal device and to communicate an order request message to a vendor responsive to an order request from the terminal device.

In a disclosed example, the second interface is configured for enabling bi-directional communications with a management server external to the premises via the wide area network. The execution of the programming by the processor further causes the gateway device to provide further functions in relation to the product ordering including management of the product ordering service based upon the communications with the management server via the wide area network through the second interface. The management function may include enforcement regarding authorization, authentication, configuration, or use of the product ordering service via the terminal based on instructions from the management server.

In an example of such a gateway device, execution of the programming by the processor further causes the gateway device to provide an application programming interface (API). The API allows application services provided on the wide area network to access functions of the gateway device in support of services provided to the user terminal. Also, the application services are managed from the management server. Communications processed through the API include receiving vendors' product data and sending the order messages.

Another aspect of the disclosure relates to a product comprising a machine-readable medium and programming embodied in the medium for a gateway device at a premises for communication with a user terminal via a local area network and for communication with a plurality of vendors' terminals via a wide area network outside the premises. Execution of the programming causes the gateway device to provide a product ordering service to the terminal. The programming provides functions of the gateway device including management of communication with the vendors' terminals and the terminal within the premises, and an application programming interface (API), for application information communicated via the wide area network. The API is adaptable to a plurality of application services provided to user terminal devices in the premises such as the user terminal, and the services are managed from the management server via the wide area network. The functions further include receiving vendors' product data and sending the order messages, providing product data obtained from the outside of the integrated multimedia service system on the user terminal via an interactive graphical user interface whereupon the user inputs an order request of a product, and transmitting the order request of products from the terminal and terminal user's data for use in delivery of the ordered product to a vendor's terminal corresponding to the ordered product.

Another aspect of the disclosure relates to an integrated multimedia service system for a user premises. The system includes a terminal device that is configured to implement client functionality for interactive communications via a local network at the user premises and a gateway device for coupling between the local network at the user premises and a wide area network. The gateway device implements server functionality for interactive communications with the client functionality implemented by the terminal device for the interactive communications via the local network at the user premises. The gateway device also implements an application programming interface (API), which provides web services communications with equipment of one or more service providers via the wide area network to enable the server functionality to deliver an application service offered by one of the providers to the terminal device using the interactive communications.

The API provides one or more function calls and one or more response messages for the web services communication with the service provider equipment which are independent of protocols used for the interactive client-server communications with the terminal. The system also includes a management server for controlling the server functionality and the API's web services communications. The management server is implemented with an API to provide communications with the service providers via the wide area network for authentication and registration of the service providers. One or more of the service providers may offer a product ordering service by which a user at the premises orders products on a user interface provided by the gateway device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

A product ordering service is supported by an integrated multimedia service system(IMSS) at a user premises. The IMSS comprises a user terminal and a gateway device within the premises. In examples discussed below, the gateway device provides a server functionality for the service when viewed from the perspective of the client functionality of the terminal. Occupants at the premises enjoy the product ordering service on an interactive user interface displayed via the user terminal. The gateway device is coupled for communication with the user terminal via a local area network, and for communication with a wide area network outside the premises. The gateway device obtains product data via the wide area network and provides the product data to the terminal for display on the display device. Upon placement of a product order by a user input through the terminal, the gateway device sends an order message outside of the integrated multimedia service system to request a corresponding vendor for the ordered product to deliver the ordered product at the premises. The product ordering service and the product data are provided and updated by a management server located outside of the premises.

While the following description addresses a food ordering service as one example, it will be apparent to one skilled in the art that the ordering service encompasses any goods or items that occupants at a premises desire to buy from the home environment.

A public Wide Area Network(WAN) is used as a transport layer between components inside a user premises and various systems outside the user premises, exemplified by an Internet Protocol (IP) network such as the public Internet in the following description. However, any other circuit switched or packet switched network is useable as the WAN. In addition, a Local Area Network(LAN) used as a transport layer between components within the user premises can employ IEEE 802.3 Ethernet, IEEE 802.11 WiFi or the like.

Figure 1:
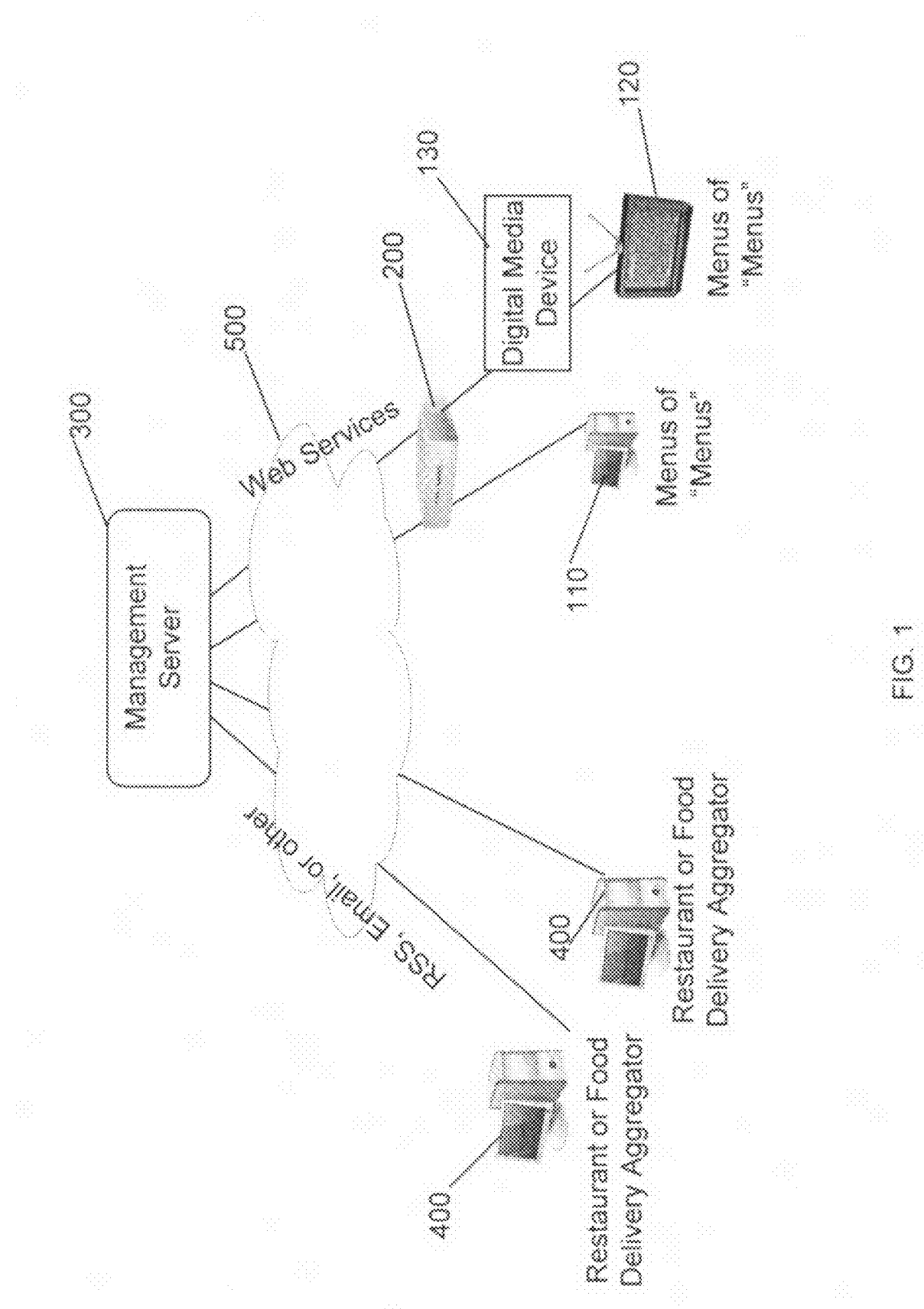
FIG. 1 illustrates infrastructures of an Integrated Multimedia Service System(IMSS) at a user's premises where a product ordering service is provided.
Figure 2:
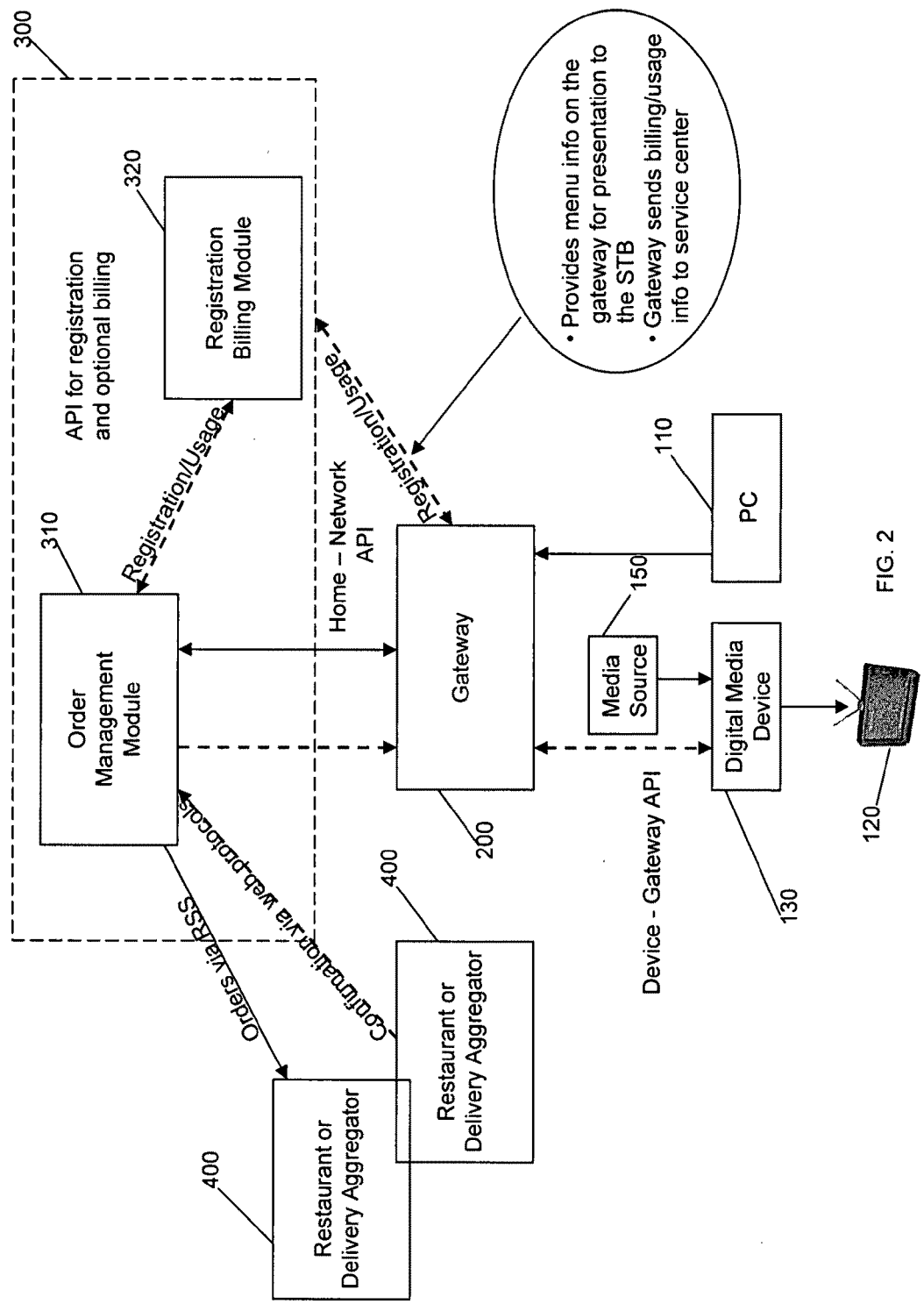
FIG. 2 illustrates a detailed interactive structure of the IMSS of FIG. 1.

Referring to FIGS. 1 and 2, a system for providing an interactive food ordering service at a premises where integrated multimedia services are provided comprises user terminals, a gateway device 200, a management server 300 and a plurality of restaurants or restaurant information aggregators' terminals (restaurants' terminals) 400. Example of user terminals include a personal computer (PC) or other data device 110 and a combination of a digital media device 130 and an audio/video system such as a television 120.

The user terminals 110, 120, 130 and the gateway device 200 are located at a premises to form an IMSS within the premises. The user terminal implements client functionality, for interactive services such as the ordering service. Each implementation of the user terminal in the premises has or connects to a display device on which a graphic user interface (GUI) for the user to input commands on view product data etc. is overlaid. The gateway device 200 is coupled to the user terminals 110, 120 via a wireline or wireless Local Area Network(LAN) and coupled to components outside the premises via a Wide Area Network(WAN) 500 such as Internet Protocol (IP) Network. While PCs 110 are serviceable to IP based communications from the IP network, TVs 120 or other audio/video equipment often require the digital media device 130 to handle data conversion, for example, to the NTSC analog TV standard. The set top box 130 may further perform data decryption, and digital rights management. The ordering service through the gateway device 200 may utilize the so-called "two-foot" interface on a PC 110 or similar data device. The ordering service also may offer service via the "ten-foot" interface through a TV 120 or the like. In the illustrated example, the digital media device 130 facilitates the ten-foot interface on the TV 120 for the ordering service.

The digital media device 130 may be a set top box(STB) or digital media adaptor (DMA). The digital media device 130 may also have a data communications link in the user premises with the gateway device 200. In an exemplary embodiment, the gateway device 200 and the digital media device 130 may be integrated into a single device, or the gateway device 200 and the digital media device 130 may be coupled together via a data communications link. One or more of the associated user terminals may be digital media device 130 communicatively coupled to the TV 120 (e.g., which may be separate from or included with audio-video system). The digital media device 130 may present a graphical user interface for at least part of a display (e.g., an insert or overlay) on the TV 120 for enabling user selection of applications, services, media, or any suitable combination thereof.

The gateway device 200 may communicate with the digital media device 130 via a wired or wireless communicative coupling serving as the data communication link within the user premises. The data communications link may be, for example, a user premises data communications network. For example, the gateway device 200 may utilize a Wi-Fi wireless network or an Ethernet wired network in order to communicate with the digital media device 130. The digital media device 130 may be communicatively coupled with the gateway device 200 via a wired Ethernet connection or other suitable wired connection. For example, the digital media device 130 may communicate with the gateway device 200 via Ethernet and a HTTPS connection to render application services to, for example, TV 120. Alternatively, the digital media device 130 and the gateway device 200 may be communicatively coupled via wireless communication.

Referring to FIG. 2, the digital media device 130 may also be communicatively coupled with a media source 150. Although one media source 150 is shown for simplicity, the digital media device 130 may be communicatively coupled to multiple media sources. The media source 150 may be an in-premises analog or digital cable television distribution or the like, a video cassette recorder (VCR), a video game console, a digital video recorder (DVR), a digital versatile disc (DVD) device, an analog or digital broadcast television signal, an analog or digital cable headend, a satellite television signal source, an analog or digital radio broadcast, or an Internet source providing audio, video, or both audio and video, any suitable combination thereof, or any other media source.

The digital media device 130 may support a plurality of different audio and video input and output interfaces (as further discussed below in connection with FIG. 3). For example, the digital media device 130 may have video interfaces HDMI, component video, composite video, S-video, or any other suitable interfaces. The digital media device 130 may also have an interface to support at least one tuner, at least one data port, any combination thereof, or any other suitable interfaces. The digital media device 130 may have a digital audio interface (e.g., Sony/Philips Digital Interface Format (S/PDIF)) or an analog audio interface, or any other suitable audio interface. The audio interfaces may be paired or integrated with the analog or digital video interfaces. The video interface may, for example, support a plurality of standard definition video streams, a plurality of high definition video streams, or a combination of standard and high definition video streams. In addition, the wired network interface and/or the wireless network interface of the digital media device 130 (as discussed below in connection with FIG. 3), may support digital audio streams, digital video streams, or audio and video data streams, or be configured to receive digital audio and/or video data files.

The digital media device 130 produces audio and/or video outputs and receives user inputs, for implementing a user interface on a TV 120 or other audio/video system for various services provided via the gateway device 200. The audio and/or video from that interface may be presented in a standalone mode (without concurrent output of other programming from the media sources) or in one of a number of modes combining audio and/or video for the interface with that from the media source. The digital media device 130 may support picture-in-picture (PIP) functionality, and may further support the ability for a user to configure the size and location of the PIP window within a display (e.g., a display presented on TV 120). The digital media device 130 may support picture-outside-picture (POP) where a plurality of windows of video may be displayed in an arrangement relative to a main video display window. For example, the POP windows may be displayed around the edge of the main video display window. The digital media device 130 may be configured to adjust the size and position of the main POP window, as well as configure the size, position, and number of secondary windows for POP. In addition, the digital media device 130 may support the display of two windows of video side-by-side. The digital media device 130 may also support picture-in-graphic (PIG), where a video image may displayed in a window within a separate graphical image. The digital medial device 130 may be configured to toggle video displays between the main window and secondary windows for PIP, POP, PIG, and side-by-side. The digital media device 130 may be configured to receive a signal e.g., from a remote control to change the focus between the main windows, secondary windows, side windows, or graphical area, or any suitable combination thereof. The digital media device 130 may be configured to receive a selection from the remote control as to an audio signal or stream to be played by a television or audio/video system for PIP, POP, PIG, side-by-side, or composite video images (e.g., overlays or insert displays), or any suitable combination thereof.

Audio or video files stored on the gateway device 200, audio or video signals received via WAN 500, or audio or video received via the media source 150 may be passed through to at least one audio or video interface of the digital media device 130 and/or may be received via a network interface. A plurality of video streams (e.g., a plurality of digital video streams, a plurality of analog video streams, or a plurality of analog and digital video streams) may be integrated to form a composite signal, which may be used to display a composite display on the TV 120, or present a composite signal for presentation on an audio-video system. This plurality of video streams that may be combined to form the composite signal may be integrated with at least one analog audio signal or digital audio signal, where the audio signal may provide audio substantially contemporaneously with the composite image. Alternatively, a plurality of audio signals may form a composite signal and may be played on the audio-video system.

These capabilities of the digital media device 130 enable presentation of an interactive graphical user interface for application services offered through the gateway device 200, e.g. from the wide area network, to TV 120 including an interface for the ordering service. For example, the GUI may provide audio and/or video output via a television presentation and allow user input via the remote control. The GUI allows the user to select and interact with gateway enabled services. In addition to the ordering service, other services may include, but are not limited to: viewing movies; viewing photos; playing music; controlling home devices of an in-home network; playing video games; controlling security features such as parental control; file backup; or any other suitable functions. The GUI also offers various notification and response functions, for example, receiving notifications of voicemail, incoming calls, or alert or update messages from devices connected to an in-home network or via wide area network, or weather updates, or other suitable notifications, alarms, or messages.

Figure 3:
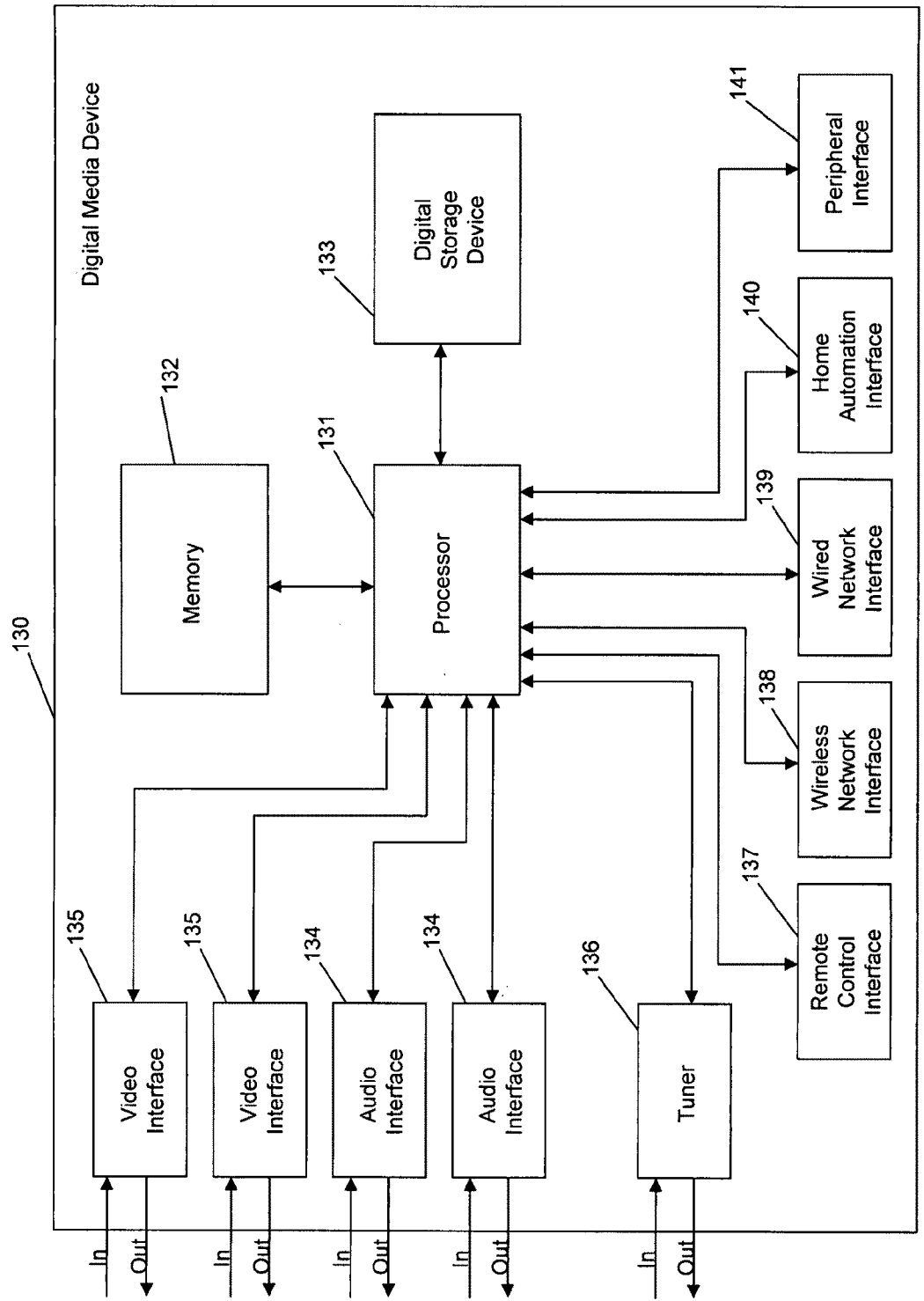
FIG. 3 is a functional block diagram of an exemplary digital media device 35 shown in FIG. 2.

Referring to FIG. 3, an example of the digital media device 130 will be described. The digital media device 35 may serve as a set-top box or as a digital media adapter for a television or other audio-video system. As shown in FIG. 3, the digital media device 130 may have processor 131, which may be a central processing unit, application specific integrated circuit (ASIC), programmable logic device (PLD), an integrated circuit, or any other suitable processing device. The processor 131 may be communicatively coupled to memory 132 and digital storage device 133. The memory 132 may be any suitable Random Access Memory (RAM), and the digital storage device 1334 may be any suitable non-volatile storage device, such as a hard disk drive, semiconductor memory, memory card, an or optical drive. The processor 131 may be configured to service a plurality of audio interfaces 134 with inputs and outputs, as well as a plurality of video interfaces 135 with inputs and outputs. The inputs and outputs of audio interfaces 134 may be stereo pairs (left and right audio channels). The operation of the processor 131, the audio interfaces 134, the video interfaces 135, and additional interfaces of the digital media device 130 are described in further detail below.

The digital media device 130 may also have at least one wireless network interface 138 (e.g., a Wi-Fi wireless network interface) and at least one wired network interface 139 (e.g., an Ethernet wired network interface). The digital media device 130 may communicate, for example with the gateway device 200 via the wireless network interface 138 or wired network interface 139. The wired network interface 139 and/or the wireless network interface 138 of the digital media device 130 may support digital audio streams, digital video streams, or audio and video data streams, or be configured to receive digital audio and/or video data files.

Still referring to FIG. 3, the digital media device 130 may also have home automation interface 140 communicatively coupled to the processor 131. The home automation interface 140 may be, for example, an X10, Z-Wave, or ZigBee interface, or any other suitable interface. The home automation interface 140 may enable the functionality of user interfaces (UI), access home automation, and other appliances.

The digital media device 130 may also have at least one peripheral interface 141, such as a USB interface, in order to enable communications between processor 131 of the digital media device 130 and mass storage devices.

At least one audio interface 134 may be, for example, communicatively coupled to one or more devices that may comprise a media source (e.g., media source 150 shown in FIG. 2) that provides, at least in part, an audio type signal. The audio interface 134 may also be communicatively coupled to the TV 120 and/or to interfaces of audio-video system in order to present audio type media content to audio-video system or television display 120. The audio type media content may be provided by, for example, the media source 150, the gateway device 200, or any other suitable source. In addition, audio type signals may be provided from the digital storage device 133, the tuner 136, the wireless network interface 138, wired network interface 139, home automation interface 140, or the peripheral interface 141 via the processor 131, which may provide audio type signals to the audio interface 134 for output for an audio type presentation. The processor 131 may also combine two or more signals received from the interfaces 134, 135, 138, 139, or from the tuner 136 or the digital storage device 133 to provide a composite audio signal to at least one audio interface 134 for output for an audio type presentation or as part of an audio-video presentation.

At least one video interface 135 may be communicatively coupled to, for example, the media source 150. The media source 150 may provide, at least in part, video type signals to the video interface 135, or alternatively, may provide digital audio and/or video signals via a networking communications protocol to the wireless network interface 138 or the wired network interface 139. In addition, at least one video interface 135 may be communicatively coupled to the interface of the audio-video system and/or to interface of TV 120 so that video type content may be delivered from the digital media device 130 to audio-video system and/or TV 120 for at least some video type presentation. Additionally, video type signals may be provided from gateway device 200 (and received, e.g., by the wireless networking interface 138 or the wired networking interface 139), digital camera, flash memory device, PMP device, or any other suitable device and output to audio-video system and/or to TV 120 for at least some video type presentation. In addition, video type signals may be provided from the digital storage device 133, tuner 136, the wireless network interface 138, the wired network interface 139, the home automation interface 140, or the peripheral interface 141 via the processor 131, which may provide video type signals to at least one video interface 135 for output for a video type presentation. The processor 131 may also combine two or more signals received from the interfaces 134, 135, 138, 139, or from the tuner 136 or the digital storage device 133 to provide a composite audio signal to at least one video interface 135 for output for a video type presentation or as part of an audio-video presentation.

At least one audio interface 134, at least one video interface 135, or a combination thereof may be used to output an audio type presentation, video type presentation, or audio-video type presentation signal generated by the processor 131, where the signal may include an insert or overlay audio and/or video signal for presentation on audio-video system and/or TV 120. The insert or overlay video signal may also include a graphical user interface. At least a portion of the programming that is executed by the processor 131 to enable the graphical user interface may be at least in part on the digital storage device 133.

The digital media device 130 may include at least one tuner 136 for receiving audio signals or video signals from a media source (e.g., media source 150 illustrated in FIG. 2). The tuner 136 may be communicatively coupled to the processor 131. As described above, at least a portion of the signal received by the tuner 136 may be output via the audio interface 134, the video interface 135, or a combination thereof. A signal received by the tuner 136 may be combined with at least one other signal from at least one interface or device by the processor 131 in order to form a composite signal which may include audio type content, video type content, or audio and video content.

The digital media device 130 may digitally record or store audio, video, images, any combination thereof, or any other suitable media received from the audio interface 134, the video interface 135, the tuner 136, the wireless network interface 138, the wired network interface 139, and/or peripheral interface 141 for or playback in the memory 132, on the digital storage device 133, or on the digital storage device 133 communicatively connected to the digital media device 130. For example, the digital storage device 133 may record incoming television signals from the tuner 136. Accordingly, the memory 132 or the digital storage device 133 may serve as a buffer for audio and video data, and a user may "pause" the display of a television signal (e.g., using a remote control), and the memory 132 or the digital storage device 133 may continue to record the incoming television signal from the tuner 136 such that a user may view the recorded television signals that are being buffered after the user de-selects the "pause" option.

The digital media device 130 may also have remote control interface 137, which may be communicatively coupled to the processor 131. The remote control interface 137 may be configured to receive wireless signals (e.g., infrared signals, radio frequency signals, etc.) from remote control. The remote control may be used to select applications or media sources presented to the user on the TV 120 and/or audio-video system.

An exemplary gateway device 200 is implemented with hardware and software modules and interfaces that control the integrated multimedia service system at the premises. The gateway device 200 is a node that bridges the integrated multimedia service system at the premises with the WAN 500 outside the premises. The hardware for the gateway device may take a form similar to that used for a PC, a server or the like which has its own a CPU, a memory, and network interfaces for communication with devices at or outside the premises. A specific hardware example is discussed later. Application software to enable various functions is installed in the memory, for execution by the CPU.

From the perspective of the clients of the terminal devices, the gateway device implements server functionality for one or more application services, including the ordering service. FIGS. 1 and 2 represent an embodiment of the IMSS at a premises where a food ordering service is provided to user terminals within the premises. While a food ordering service is addressed below as an example of products, the product encompasses all other goods or services which can be an object for online transaction. The gateway device 200 stores in its memory data about terminal users' information, such as history of terminal users' orders, terminal users' preferences or the like. Categorized data about food and restaurants provided from the management server 300 are also stored in the gateway device 200 and sent to the user terminals 110, 120 per request via the GUI on the display devices. The gateway device 200 in the example implements web services communications with the management server 300, and through the server 300 (or directly) equipment of food deliver services providers.

The gateway device 200 provides an interface to the Digital Media Adapter (DMA) for the TV 120, which enables bidirectional wireline or wireless communication. The DMA converts audio and video to a format suitable for the TV 120. The gateway device 200 further provides a bidirectional wireline or wireless interface to the PC 110 for supporting the transfer of media or data to the PC 110 for storage and viewing. The interaction of the PC 110 with the application service logic of the gateway device 200 offers a GUI for the user's interactive services.

Still referring to FIGS. 1 and 2, the management server 300, which is remotely located outside the premises, accesses the gateway device 200 for controlling transport and storing of data, and downloading and enabling service applications and providing largely invisible support for many tasks performed by users. The management server 300 includes two module units, an order management module 310 for handling orders from the user terminals 110, 120 and a registration and billing module 320 for authenticating registration of vendors' terminals 400 and user terminals 110, 120 and handling billing with regard to the home automation services and the food order service. The two module units 310, 320 are implemented with software applications installed in a server or are implemented with physically separate servers. Functionality of the two module units 310, 320 are performed by execution of application software stored in the memory of the management server.

The order management module 310 obtains data about restaurants and foods from restaurant terminals or restaurant information aggregator terminals 400 by its own search or supply from the restaurant terminals or aggregator terminals 400. The data are customized to an appropriate format for the user terminals 110, 120, for example categorization according to price and types of food and locations of restaurants, and sent to the gateway device 200 which thereby updates the data stored in the gateway device 200.

The order management module 310 receives order message from the gateway device 200 and distribute the order message to the corresponding restaurant's terminal 400.

The registration and billing module 320 receives and authenticates registration requests from the restaurant terminals or the aggregator terminals 400 and the user terminals 110, 120 for subscribing to services provided by the management server 300. The registration and billing module 320 handles billing process for the home automation services at the premises and food ordering provided to user the terminals 110, 120. The registration and billing module 320 stores identification details of the user terminals and the restaurant terminals and billing information for the home automation services and food ordering services.

The management server 300 has a network interface with the IP network to implement a bidirectional communication with the restaurant terminals 400 and gateway devices 200 at the premises. In the example, the communications are based on e.g. TCP/IP protocol, and may be appropriately secured.

The management server 300 provides the gateway device 200 with peer-to-peer communication capabilities with other gateway devices 200 located at other premises. The contact list of distant gateway devices including addresses of the gateways is stored within each gateway device or the management server 300. The management server 300 uses the contact list to enable the gateway devices 200 located distant from each other to share and exchange messages via a networking and presence protocol such as Extensible Messaging and Presence Protocol (XMPP) messaging. The grouped contact list of gateway devices is provided on the GUI of each user terminal whereupon the user can input and share their information or opinion about food or restaurants.

The restaurant or the aggregator terminals 400 are PCs, point-of-sale terminals, internet terminal appliances or the like which can handle orders forwarded from the management server 300 and initiate registration or subscription request to the management server 300. The aggregator terminals 400 collects and provides to the management server 300 information of restaurants and foods. The aggregator terminals or restaurant terminals 400 periodically or randomly sends updated information of foods and restaurants to the management server 300. The restaurant or aggregator terminals 400 have network interfaces for TCP/IP based communications with the management server 300.

Figure 4A:
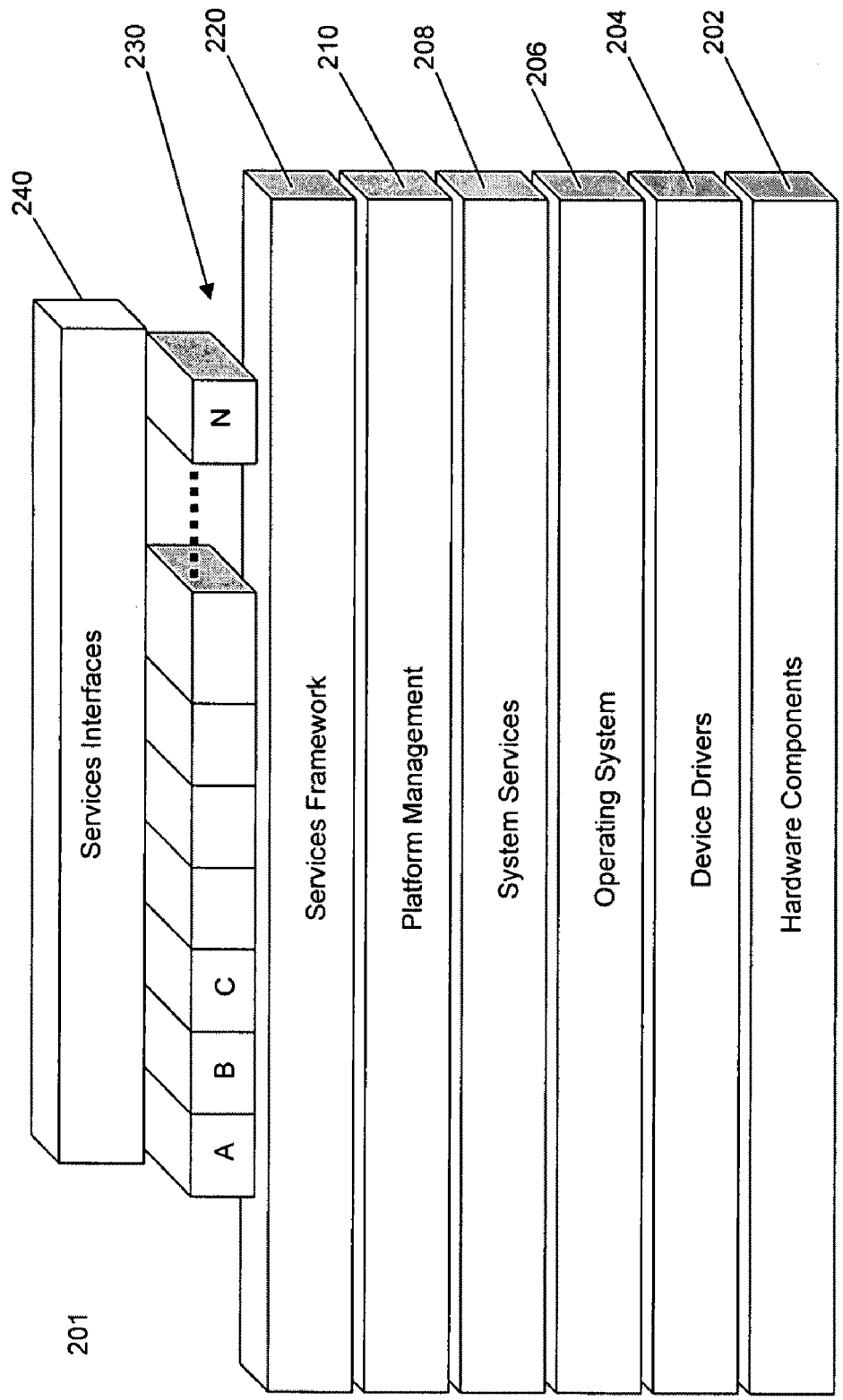
FIGS. 4A-4D depict the software and hardware architectures of a gateway device of FIGS. 1 and 2.
Figure 4B:
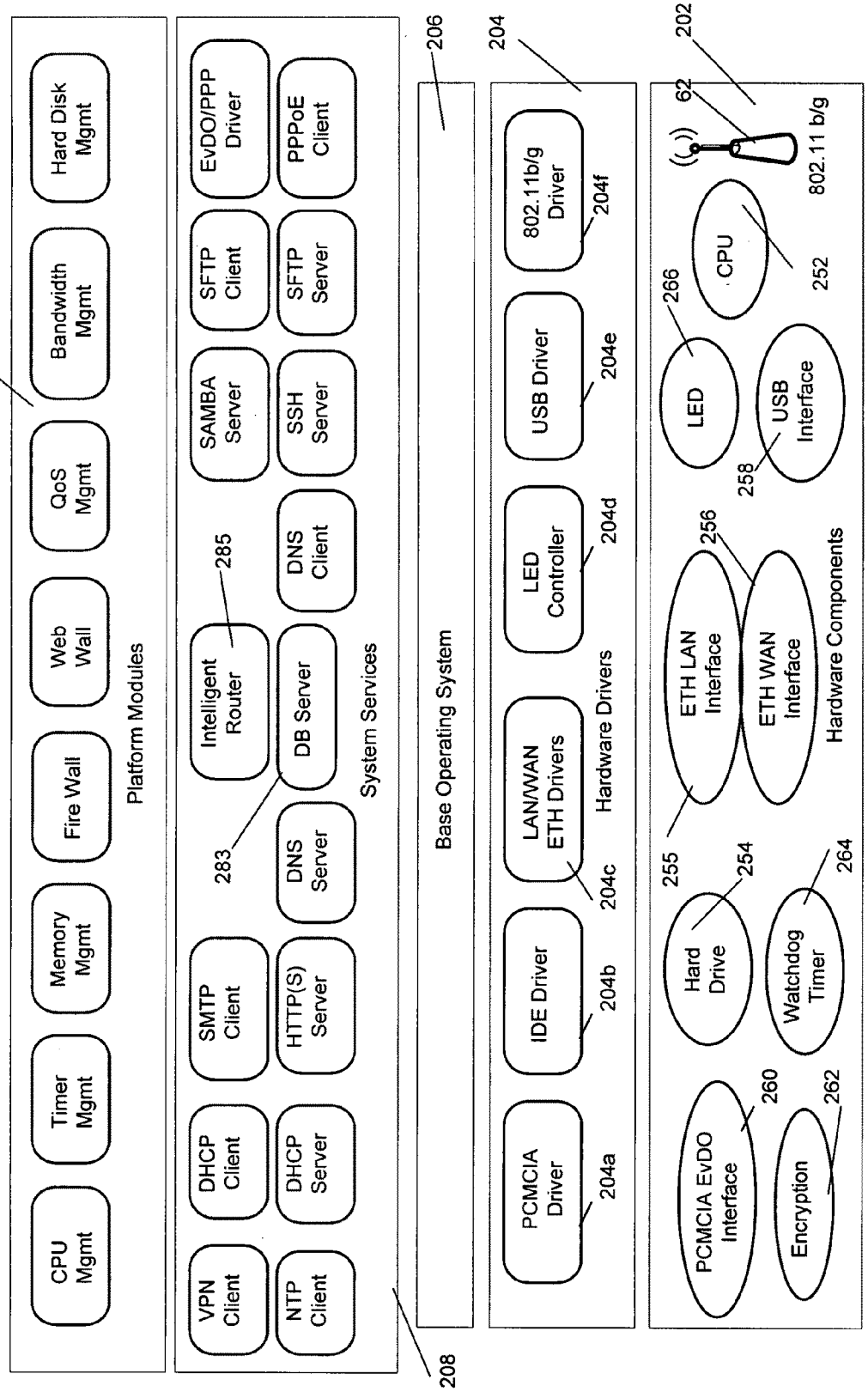
Figure 4C:
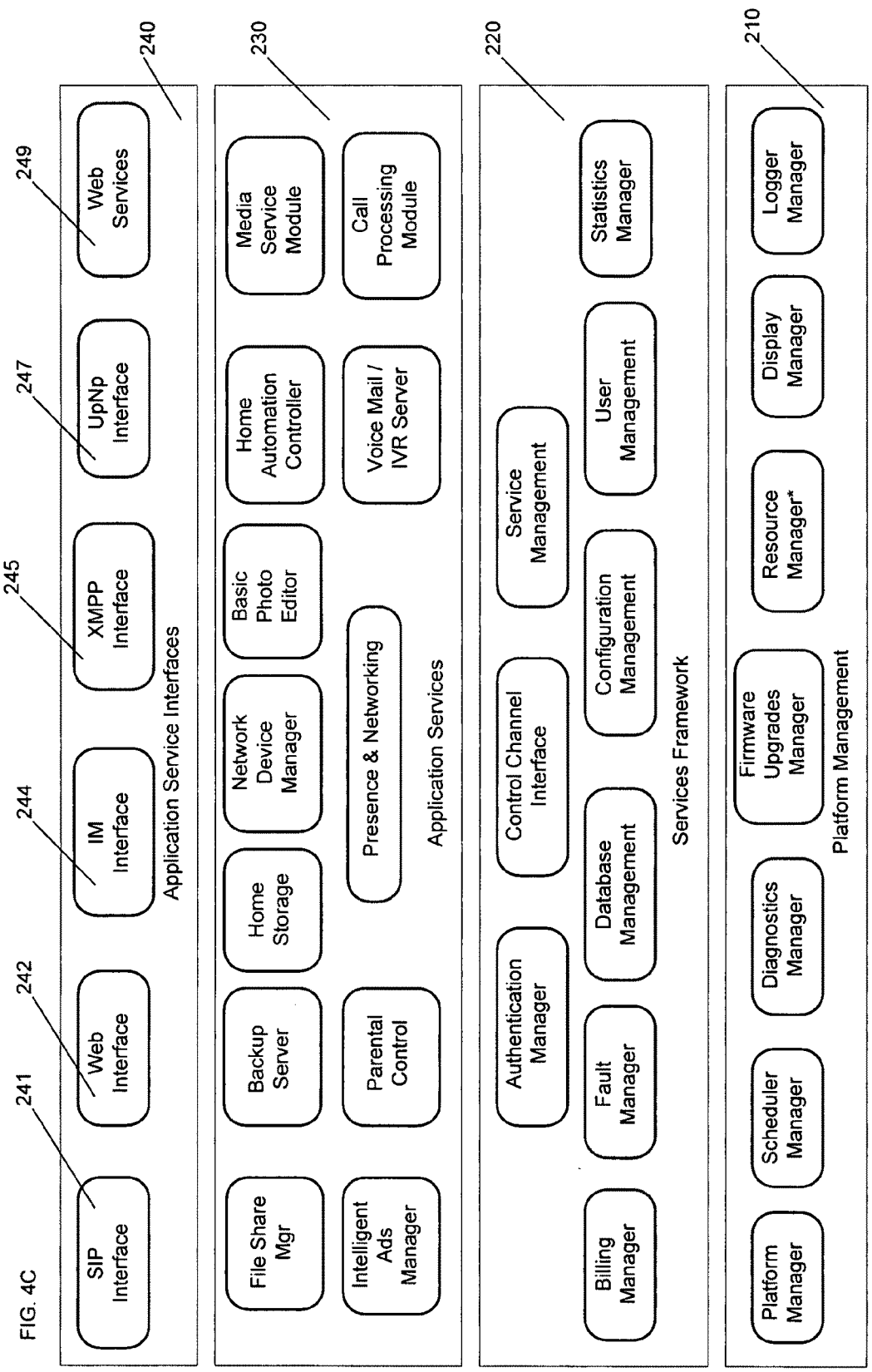
Figure 4D:
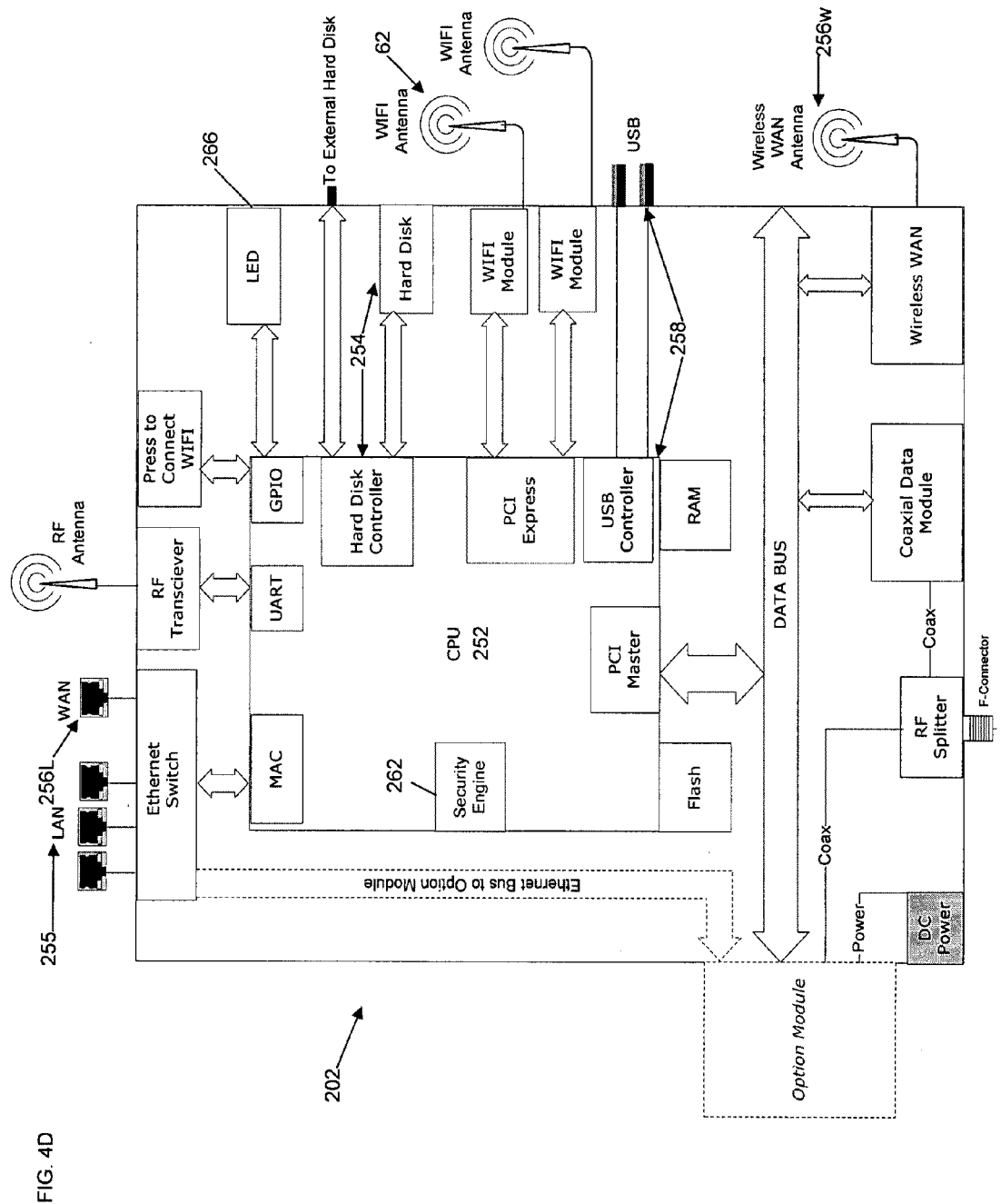

One exemplary composition of the premises gateway device 200 is now described in greater detail with reference to FIGS. 4A-4D. As shown in FIG. 4A, the gateway device 200 utilizes a layered architecture 201, which enables the encapsulation of similar functionality and the minimization of dependencies between functions in different layers. FIGS. 4B and 4C depict exemplary functionality (hardware and logical) resident in, or corresponding to, each of the layers shown in FIG. 4A. The layers include a hardware layer 202, and device driver software 204 for allowing the processor to operate other hardware elements of the gateway device 200. FIG. 4D is a functional block diagram illustrating interconnection of exemplary elements of the hardware layer 202. The Hardware Drivers 204 govern the operation of the Hardware Components 202. The processor runs an operating system shown at layer 206. The layered architecture 201 also includes software for systems services 208 and for the platform management layer shown at 210 in this drawing. Logical elements are implemented in the exemplary architecture of FIGS. 4A-4D by the platform modules 209 and the platform management layer 210.

Particular logical elements comprising an Application Service Logic(ASL) and an Application Service Enforcement (ASE) functionalities of an AS Layer which is a functional layer that provides "server" type access to application services by application clients in the terminal devices and that reside on the gateway device 200 are depicted in FIG. 3C, and comprise logical elements from each of services framework 220 and application services 230 The ASL and the ASE functions are implemented as high-level server type logic within the home gateway device at a user premises. The layered architecture in FIG. 3C facilitates reuse or sharing of logic across the layers to provide a managed service framework 220. The service management functionality provided by the framework 220 enables deployment of new services as pluggable modules comprising computer readable instructions, data structures, program modules, objects, and other configuration data, in a plug and play fashion. The layered service architecture 200 additionally provides the gateway device 200 with intra-process communication and inter-process communication amongst the many services and modules in the service framework layer 220 that enables the provisioning, management and execution of many applications and services 230, depicted e.g. services A, B . . . N at the gateway device 200. Additionally provided are the application service interfaces 240 that enable communications from user terminals with service environments. In that regard, the interfaces 240 enable the application service logic 230 to act as an appropriate server with respect to client device application or service functionality of the terminals. The application service interfaces 240 also enable corresponding interfaces for the application services with aspects of service environments implemented outside the user premises. In that regard, the interfaces 240 enable the application service logic 230 to act as an appropriate client, for extending the application or service related communications to a server accessed via the WAN 500, such as a server of the management server 300. For example, the gateway device may appear as a SIP server to a SIP client in an end point device, e.g. for a VoIP telephone service; but the gateway device will appear as a SIP client with respect to some related functions provided by a server (such as a SIP directory server) provided by the management server 300.

FIG. 4A thus depicts a high level service framework upon which are built services, e.g. downloaded via the management server 300 and WAN 500 as packages that are developed and offered by a service entity for customers. These services may be offered as a part of a default service package provisioned and configured at the gateway device 200, or provisioned and configured subject to user subscription and may be added at any time as plug-in service modules in cooperation with the management server 300. It is understood however, that while the gateway device 200 includes much of the intelligence or service logic for providing various services, it is also possible that for some services, some or all of service logic may reside in the management server network and/or with a third party provider.

As shown in more detail in FIGS. 4B and 4D, the base support layer 202 comprises hardware components including a processor device 252, e.g. a system on chip central processing unit ("CPU") that includes processing elements, digital signal processor resources and memory. The CPU 252 is also coupled to a random access memory ("RAM") and additionally, non-volatile hard drive/disk magnetic and/or optical disk memory storage 254. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 254 may be partitioned into a network side which is the repository for storing all of the service logic and data associated with executing services subscribed to by the user, and, is invisible to the user, and, a user side for storing user generated content and applications in which the user has visibility. Although not shown, the CPU 252 may be coupled to a microcontroller for controlling a display device.

Additional hardware components include one or more Ethernet LAN and WAN interface cards 255, 256 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. The card 255 referred to as the LAN interface card provides data communication connectivity within the user premises, essentially, for communication via a user premises network with any terminal devices operating within the premises. The card 256 referred to as the WAN interface card provides data communication connectivity for the gateway device 200 and terminals communicating through the gateway device 200, with the wide area IP network 500. For additional or alternative customer premises communications, the hardware components 202 may also include one or more USB interfaces 258; and for additional or alternative communications with the wide area network, the hardware components may also include the PCMCIA EvDO interface card 260.

A data encryption/decryption unit 262 is additionally provided as part of the architecture for providing data security features. A watchdog timer element or like timer reset element 164 is provided as is one or more LED devices 266 for indicating status and other usable information to users of the gateway device 200.

As mentioned above, the gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 252.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 4B, the device driver layer 204 comprises a multitude of driver interfaces including but not limited to: a PCMCIA driver 204*a*, for enabling low level communication between the gateway CPU 252 and the PCMCIA network interface card wireless interface, an IDE driver 204*b* for enabling low level communication between the gateway CPU 252 and the local mass memory storage element, and LAN/WAN drivers 204*c* for enabling low level communication between the gateway CPU 252 and the respective network interface cards 255 and 256. The exemplary driver layer also includes an LED driver/controller 204*d* for driving LED(s) 266, a USB driver 104*e* allowing CPU 252 to communicate via USB interface 258, and an 802.11 b/g (or n) wireless network driver 204*f* for allowing the CPU 252 to communicate via the access point 62. The drivers provide the logical connectivity between the low level hardware devices 202 and the operating system 206 which controls the execution of computer programs and provides scheduling, input-output control, file and data management, memory management, and communication control and related services for the gateway device. With respect to the operating system 206, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Linux or UNIX or even an embedded Linux operating system. For instance, the gateway device 200 may be advantageously provided with an embedded operating system 206 that provides operating system functions such as multiple threads, first-in first-out or round robin scheduling, semaphores, mutexes, condition variables, message queues, etc.

Built upon the system operating system 206 is a system services support layer 208 providing both client-like and server-like functions that enable a wide range of functionality for the types of services capable of being managed by the gateway device 200. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 200 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination govern the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 200 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 208 is intelligent routing capability provided by an intelligent router device 285 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital terminals subordinate to the gateway. A central database server 283 handles all of the database aspects of the system. For example, the database server 283 maintains and updates registries and status of connected digital terminals, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 283 also satisfies all other database storage needs as will be described in greater detail herein.

Referring back to FIGS. 4A and 4B, built on top of the system services layer 208 is the platform module layer 209. The platform module layer 209 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture 201 further provides a platform management layer 210 as shown in FIG. 3C, which together with the platform modules 209 implement the platform management layer/logic discussed earlier.

The features/functions in the layer 210 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 210 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g. voice call logs, at the user premises. The platform management layer 210 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc.

The logical platform management layer 210 allows for inter-layer allocation of local resources. This function guarantees access between the application service/management logic implemented at the higher layers in the gateway device 200 and the applications service management function in the management server 300, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 4A and 4C, built on top of the platform management layer 210 is the Services Framework 220, which provides a library of application support service processes that facilitate data collection and data distribution to and from the multimedia terminals. The application support service processes include, but are not limited to: an authentication manager for use in authenticating devices connected to the gateway device; a billing manager for collecting and formatting service records and service usage by terminals, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 220 is the Application Services layer 230 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 200 further provides application service interfaces 140 that are used to enable a variety of user applications and communications modalities.

For instance, the SIP Interface 241 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the management server 300.

The Web Interface 242 enables HTTP interactions (requests and responses) between two applications. The Web services interface 249 provides the access interface and manages authentication as multi-services gateway devices access the management server 300 via web services. The IM Interface 244 is a client that enables the multi-services gateway device 200 to connect to one or more specific IM network(s). As further shown in FIG. 3C, the UpNp (Universal Plug and Play) interface enables connectivity to other stand-alone devices and PCs from many different vendors.

The XMPP interface 245 is provided to implement the protocol for streaming (XML) elements via the gateway device 200, in order to exchange messages and presence information in close to real time, e.g. between two gateway devices or for a control channel with the management server 300. The core features of XMPP provide the building blocks for many types of near-real-time applications, which may be layered as application services on top of the base TCP/IP transport protocol layers by sending application-specific data qualified by particular XML namespaces. In the example, the XMPP interface 245 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

As noted, FIG. 4D provides a functional block diagram of exemplary elements of the hardware layer 202. For example, a system on a chip provides the CPU 252 and associated system components. The CPU 252 is also coupled to a random access memory ("RAM") and flash memory. The system on a chip also includes a hard drive controller for controlling a hard disk drive, and together the controller and drive form the hard disk example of the storage 254. An Ethernet switch and associated LAN port(s) provide the Ethernet LAN interface 255; and the Ethernet switch and associated WAN port provide a landline implementation of the WAN interface 256L, for connection to a broadband modem or the like implementing a Network Service Provider Wide Area Network Termination Apparatus (NSP-TA) which allows for a typical termination of Wide Area Network Services, such as DSL, Cable, Fiber, etc, by a network services provider. The WAN interface may also be wireless, as implemented at 256w for example by a wireless WAN module and associated antenna. An example of such an interface would be the EvDO interface discussed earlier. If the gateway device uses the wireless WAN interface 256w, there would be no separate NSP-TA.

In the example of FIG. 4D, a USB controller in the system on a chip and one or more associated USB ports provide the USB interface 258. The USB interface 258 may provide an alternate in-premises data communication link instead of or in addition to the wired or wireless Ethernet LAN communications. The system on a chip includes a security engine, which performs the functions of the data encryption/decryption unit 262.

The hardware layer 202 may also include an option module, Hardware components of a User Network Application Delivery Apparatus (UNA-DA). The UNA-DA is a separate managed gateway device that a managed service provider would control in delivering a set of application services to the user premises, at layer 202 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

The gateway device 200 includes one or more Application Programming Interfaces(APIs), which allow application services provided on the WAN 500, here web application services on the IP network, to access devices and functionalities thereof within the premises without being aware of specific details of the devices within the premises. The API includes processes for listening to command and status messages, and parsing those messages to determine which processes, if any, are involved in handling the control message.

Figure 5:
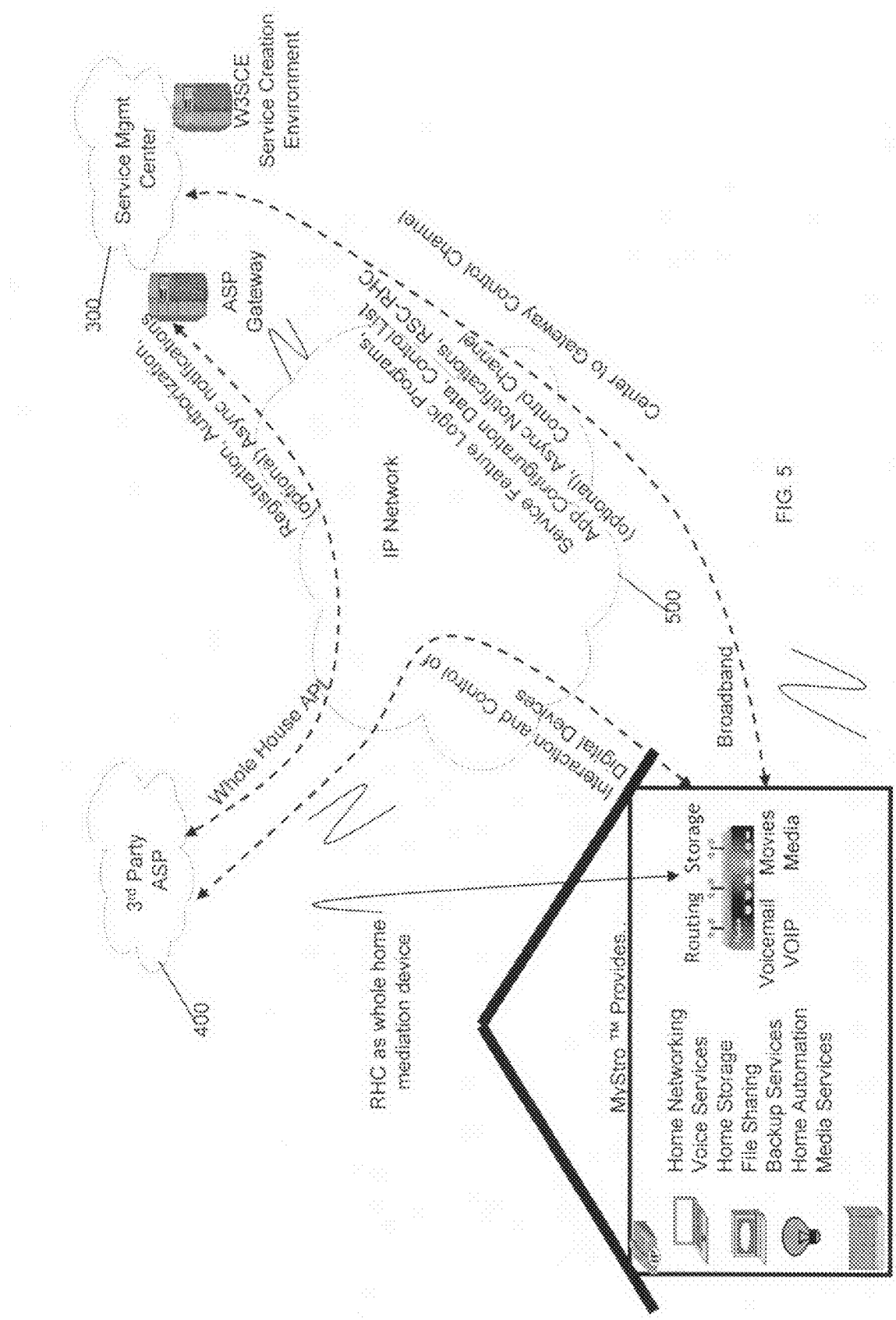
FIG. 5 illustrates an exemplary operation of an Application Programming Interface (API) in the IMSS.

Referring to FIG. 5, the API serves as a message broker that provides services that coordinate communication between web applications service provider (ASP), e.g a restaurant terminal 400 in the example discussed below, the management server 300 and the user terminals 110, 120. The API provides standard function calls and response messages, for use by the ASP; and it translates as needed to interact with gateway functionality and through the gateway with various terminal devices. In the communications between user terminals 110, 120 and the gateway device 200, the user terminals 110, 120 at the user premises implements client functionality and the gateway device 200 operates as a server for interactive communications with the client user terminals 110,120. The API provides IP based communications with equipments of one or more ASPs 400 outside the premises through the IP based wide area network and thereby enables the server functioned gateway device 200 to deliver an application service offered by the ASPs 400 to the user terminals 110, 120. The API's operation at the gateway device 200 is controlled by the management server 300. The management server 300 also implements an API to provide an interactive functionalities for authentication and registration of the ASPs 400 to the management server 300.

Referring to FIGS. 4A-4D, 6 and 7, API's functionalities and interactions with other functional modules of the gateway device 200 will be described. Some of the functional modules discussed in FIGS. 4A-4D are selectively illustrated in FIGS. 6-7 for showing the API's functionalities. An API Service Engine/Manager (ASM) 290, which is a software implemented collection of functionalities, operates as a process in the integrated digital multimedia service system at the premises deriving from Service Manger Framework in FIG. 3C. The ASM 290 stored in the gateway device 200 takes the form of a software to perform a collection of functionalities. The ASM 290 is controlled by the management server 300.

The platform manager interface 21 interfaces with the Platform Manager 210 which monitors and manages the ASM process such as stop and restart of the ASM process.

The ASM 290 reads service configuration parameters via Configuration Manager library 22. The ASM 290 receives, stores and supports the ASP profile and IMSS subscriber configuration data from the management server 300. The ASP profile uses Extensible Markup Language (XML) and includes ASP identifiers, security credentials for receiving ASP services, ASP supported services, a URI for the ASP services, the latest API version supported by the ASP, list of applications for each ASP service, and ASP supported list of media types, formats and notification methods. The IMSS configuration data also use XML format and include ASP services the IMSS user subscribes for, media types and formats supported by each application, and notification methods. The ASM 290 generates an "Alarm" message 23 and sends a process shutdown request to the Platform Manager 21 via the platform manager interface 21, if the configuration data received from the management server is incorrect. When the ASM starts or restarts its operation, it loads the last saved ASP profile and the IMSS configuration data.

In the example, the ASM 290 uses Representational State Transfer (REST) protocol 24 to communicate with the ASP 400. The ASM's HTTP based requests use GET type requests. Responses to the requests are in XML, JSON or PHP format which the ASM 290 supports. The responses and media referred to in the responses can be flagged to be cached in each response. The ASM 290 uses the cached responses and media for a subsequent request, until the cache setting times out. The caching settings are based on the HTML meta-tags for caching.

The ASM 290 is designed such that a new ASP 400 can be dynamically added, or an existing ASP can be updated or removed. The addition or updating of the ASP 400 providing the application services to the ASM 290 is controlled by the management server 300. If an error occurs during adding, removing or updating of the ASP services, the ASM generates an "alarm" messages through an Alarm/Statistics Interface 23.

Each service has a dynamical application list that is modifiable. Each application has a list of functions to be controlled by the policy of the ASM. Some of the functions require credentials to be supplied by the ASP 400. If the user tries to invoke a function that is not supported or not subscribed for, the ASM 290 returns an error message.

The ASM 290 uses a logger manager interface to log events at various levels. The ASM use a download manager interface 25 to download files. In order to provide buffering time, a storage manager interface 26 is used while streaming. The ASM 290 uses and publishes the event/notifications from the ASP 400 using event manager interface 27. The IMSS subscriber's policy profile governs the events sent to the user GUI. Cache Manager 28 caches the API call responses.

Data such as last received ASP profile from the management server, last received IMSS subscriber profile data and service configurations persist either in flat files or database. Usage data and error conditions used for statistical analysis are sent through the Alarm/Statistics manager interface 23 to the management server 300.

Figure 6:
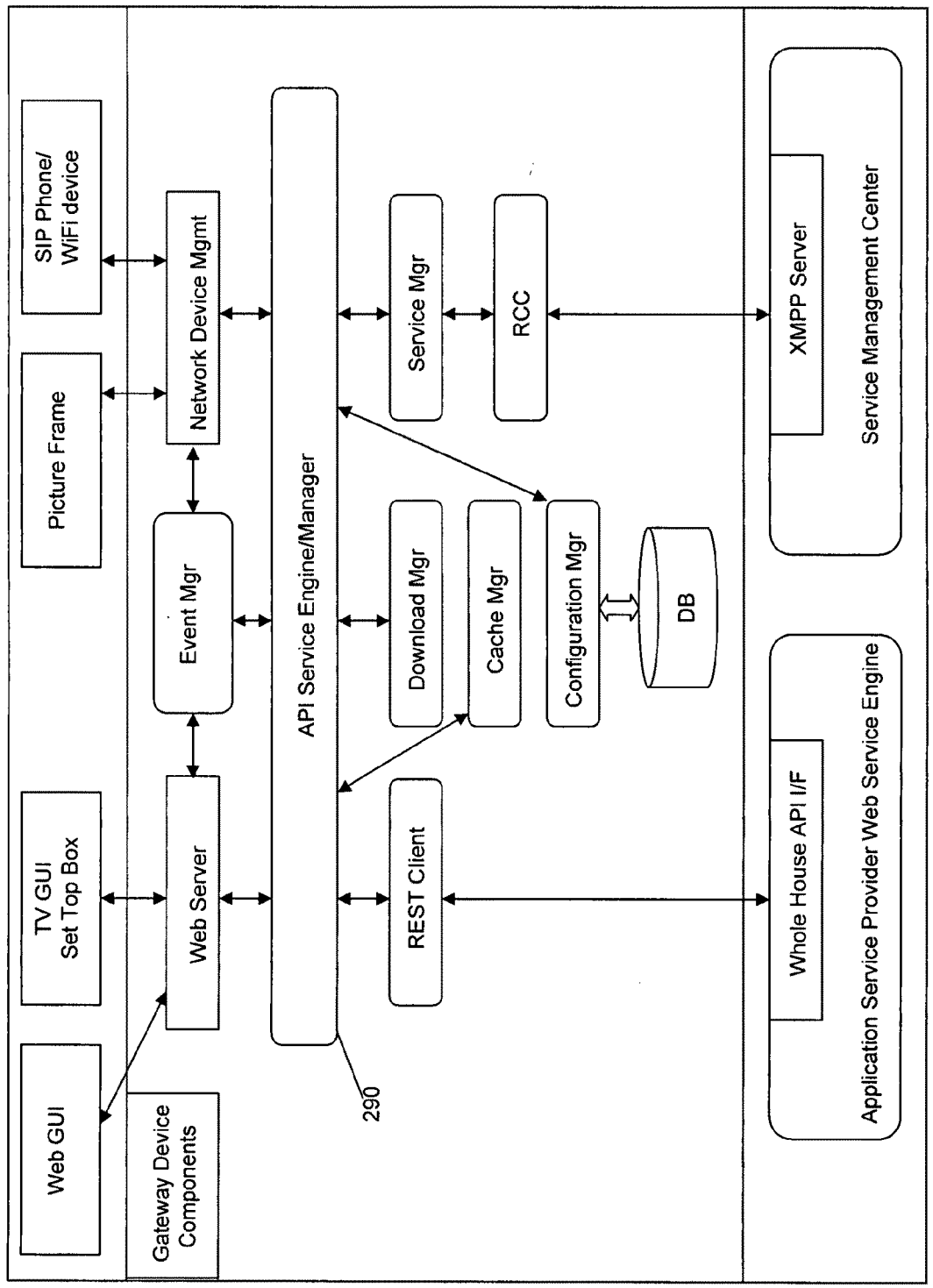
FIG. 6 illustrates interactions of an API Service Engine/Manager(ASM) with functional modules and elements of the IMSS.
Figure 7:
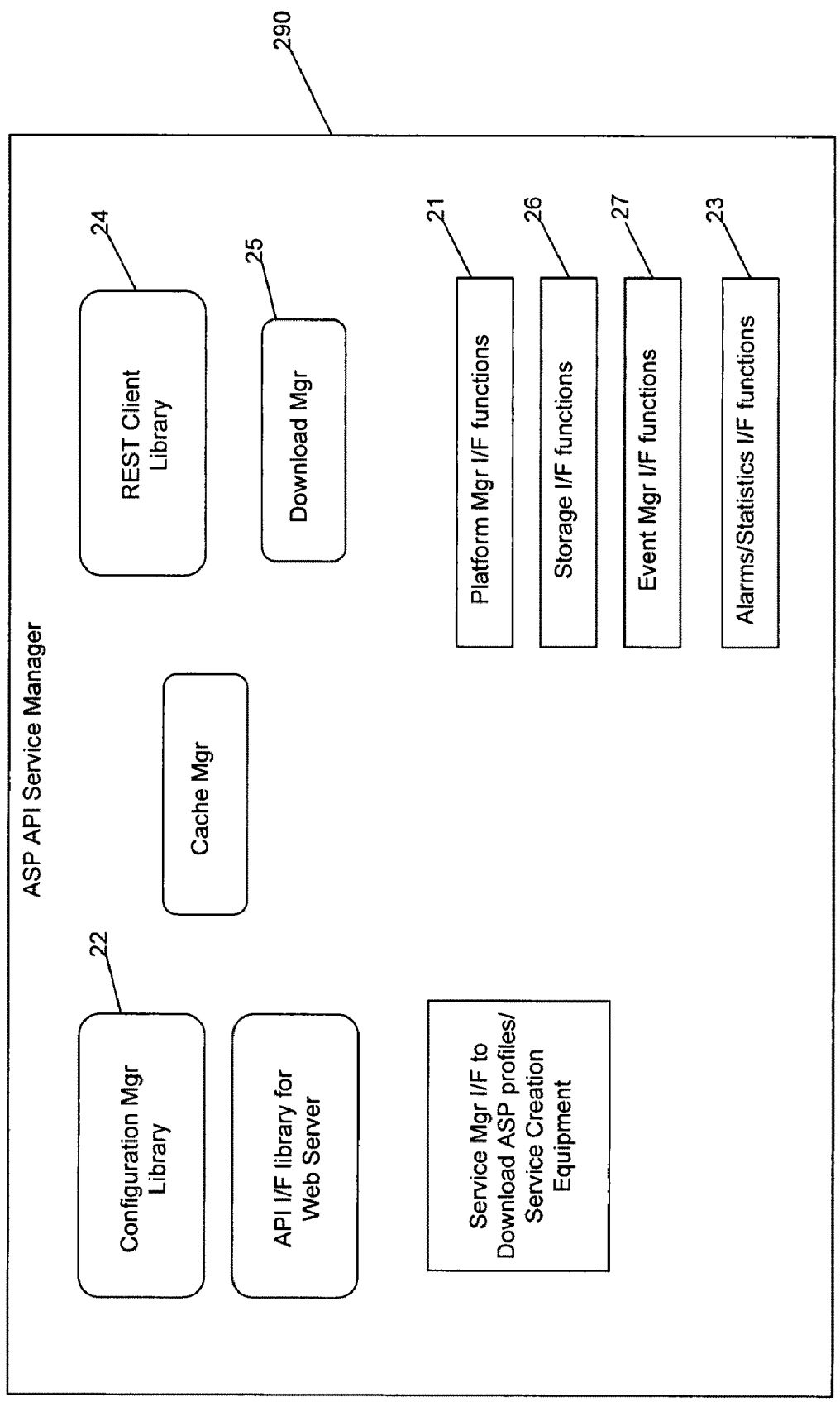
FIG. 7 depicts functional modules of the ASM of FIG. 6.
Figure 8:
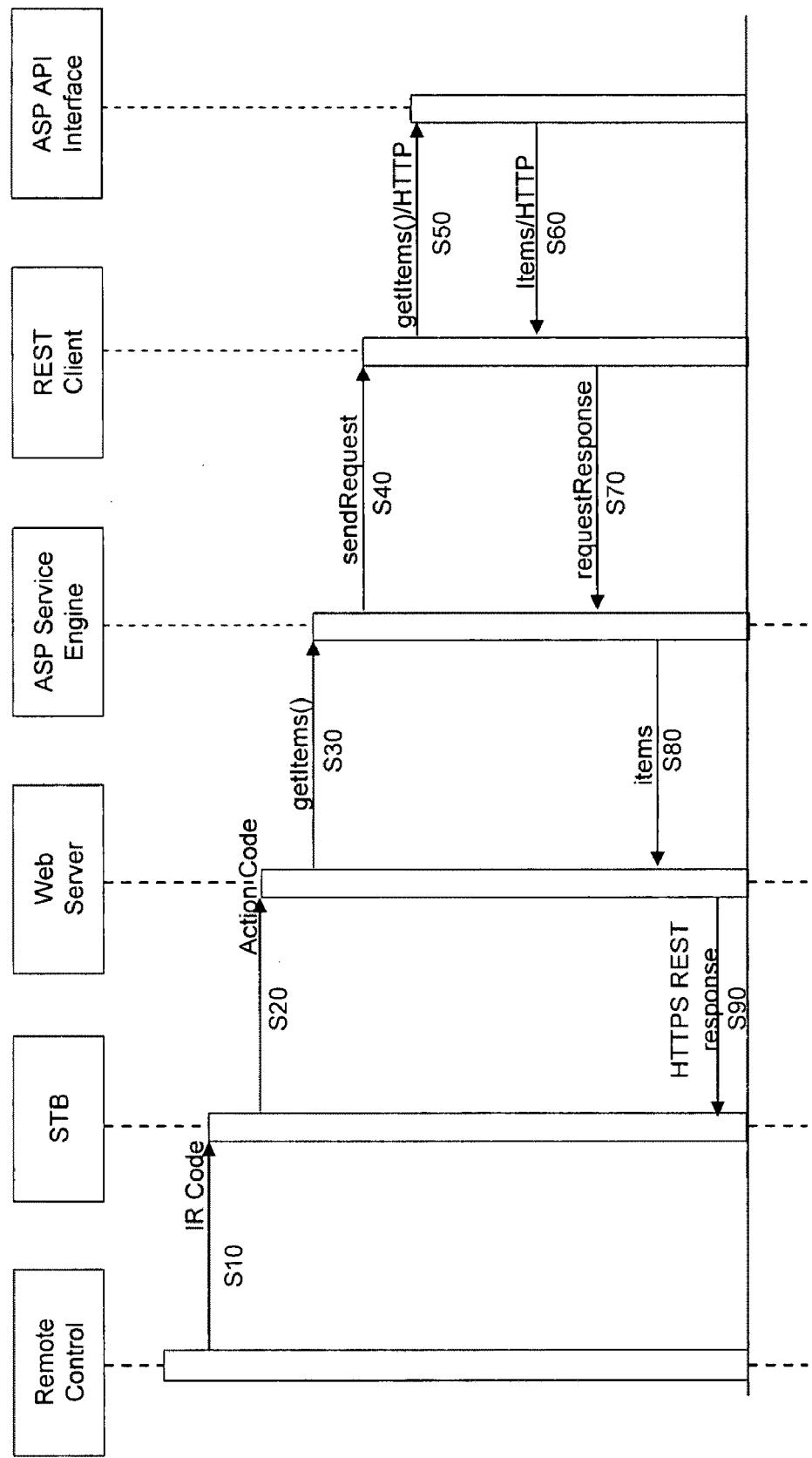
FIG. 8 illustrates a call flow showing an example where an application service is provided to a TV connected to the gateway device.

Referring to FIGS. 6 and 8, a process by which an application service is provided to a TV connected to the gateway device 200 upon a request by a user via a remote control for the TV will be described. A user at the premises where the integrated multimedia service system is installed requests a service provided by the ASP 400 using a remote control for a TV. The request is sent via an invisible Infrared light typically used for the remote control. (S10) The STB 130 converts the analog Infrared light request from the remote control into digital codes and sends them to a web server installed in gateway device 200. (S20) The web server is a software implemented entity which can be separate from the gateway device 200 or a functional module stored in the gateway device 200.

The web server sends an HTTP based GET-type request to the ASM 290, which invokes ASM's functionalites. (S30) The ASM 290 sends the application request to the REST client based on the REST protocol. (S40) The REST client forwards the application request to the ASP 400 which provides the requested application service. (S50) The ASP 400 receives the application request and sends the requested application service through the ASP API interface. (S60) The REST client receives and forwards the requested application service that is XML, JSON or PHP type data to the ASM 290. (S70) The ASM receives and converts the XML, JSON or PHP type data application service to an appropriate type data for the web server and sends the converted data to the web server. (S80) The web server receives the converted data and sends them to the STB 130. The STB 130 displays the requested service on the TV. (S90)

Figure 9:
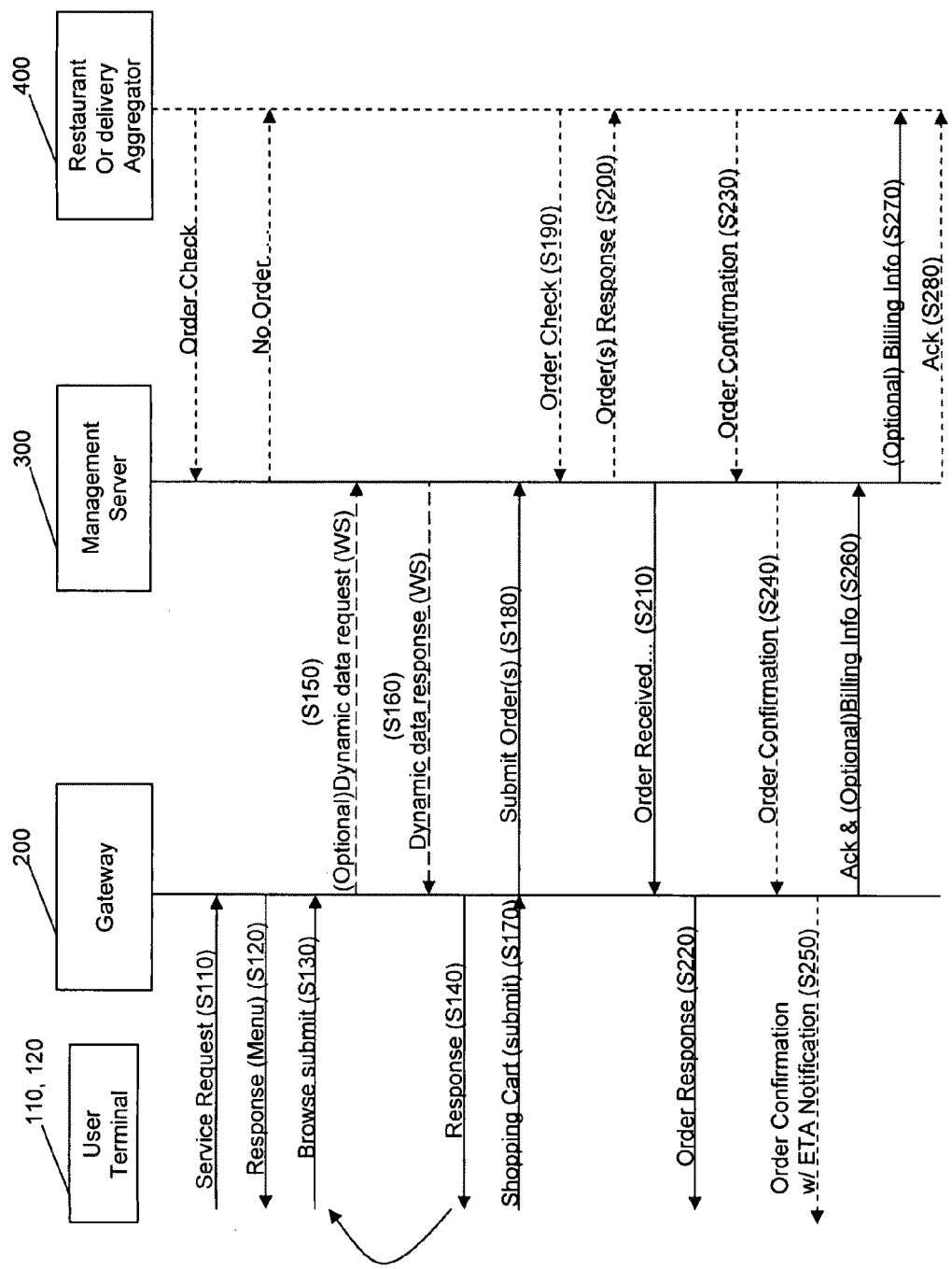
FIG. 9 is an exemplary call flow diagram illustrating process of the food ordering service.

Referring to FIG. 9, the process of food ordering services are described below. The user terminal 110, 120 requests the food ordering service through the GUI displayed on its own display and the request is sent to the gateway device 200. (S110) The request is submitted to the gateway device in a suitable manner, such as in the form of an Hyper Text Markup Language (HTML) request. The gateway device 200 provides a GUI menu on which restaurant and food data are displayed in response to the request of the user terminal 110, 120. (S120) The food and restaurant data are categorized based on types, price or other features of food and locations of restaurants. The food and restaurant data are supplied and updated by the management server 300.

The user browses food and restaurant data on the GUI menu and requests more information to the gateway device 200 by the interactive browsing on the GUI menu. (S130) In response to the browsing and the request, the gateway device 200 provides more information to the user terminals 110, 120. (S140) When the gateway device 200 does not store the information requested by the user terminals 110, 120, the gateway device 200 requests the management server to provide the information. (S150) Upon the request, the management server 300 sends the requested information to the gateway device. (S160) If the management server 300 does not have the requested information, the restaurant terminals 400 updates the information.

Once the user terminal 110, 120 places an order of food on the GUI menu, the order is sent to the gateway device 200. (S170) The gateway device 200 retrieves user's information stored therein and submits the user's information as well as the order to the management server. (S180) The user's information may include user delivery information, user preference information, user payment information, or any other suitable information associated with the user. The user delivery information for a user may include any suitable information relating to contacting and delivering to the user, such as a deliver to address including a street address and preferably a city, zip code, or both; one or more telephone numbers or portions thereof, such as an area code; or special delivery instructions. The user payment information for a user may include any information relating to payment by the user for food items, such as a preferred method of payment, a credit card number, or any other suitable payment information. In this embodiment, the restaurant terminal 400 deals with the billing for the order directly with the user terminal 110, 120 without mediation by the management server like other conventional online transactions.

Each of the restaurant terminals 40 accesses the management server 300 at a predetermined time and checks whether an order is placed to the restaurant. (S190) Alternatively, the management server 300 sends the order together with the user information to the corresponding restaurant terminal upon receiving the order from the gateway device 200. After the restaurant terminal 400 receives the order, the management server 300 notifies the gateway device 200 of the receipt of the order by the corresponding restaurant terminal 400. (S200, S210) The gateway device 200 forwards the notification of the receipt of order to the user terminal 110, 120. (S220)

After receiving the order, the restaurant terminal 400 initiates delivery of ordered food and sends confirmation of order to the management server 300. (S230) The management server 300 forwards the confirmation of order to the gateway device 200 and the gateway device 200 transfers the confirmation of order to the user terminal 110, 120. (S240, S250) The confirmation of order may include delivery information such as time of delivery and way of delivery. The delivered place may be the premises where the IMSS is established or other addresses. The confirmation of order will be displayed on the GUI of the user terminal 110, 120 for the user to be informed.

In another embodiment, the gateway device 200 sends the user's payment information to the management server 300 after receiving the order confirmation. (S260) The management server 300 accumulates and integrates the bill for transaction of the ordered food to the periodical billing for the home automation service at the premises periodically. (S270) The restaurant terminal 400, in advance, registers to the management server's bill integration service. At the same time, the management server 300 notifies the restaurant terminal 400 of the end of the transaction of the order. (S280)

As another embodiment of billing for the transaction of ordered food, a payment server operated by a credit card company or the restaurant may process the billing for the transaction of the ordered food. In this example, billing information such as credit card number or bank account number of the users is stored in the gateway device 200 or the management server, which obviates the need for the user to input billing information at each transaction.

As another embodiment of billing for the transaction of ordered food, an account for each terminal's user sponsored by the management server is set up with a credit card company. Billing for the transaction of the ordered food and services provided by the management server 300 are processed through the account. Balance of the account is periodically paid by the user's credit card.

In another embodiment, the user can input opinion about food and restaurant services via the GUI of the user terminal 110, 120. The opinion is sent to the gateway device 200 and is forwarded to the management server 300. The management server 300 collects the opinions inputted by plenty of user terminals 110, 120 and provides the collected opinions on the GUI of the user terminals. The user terminals 110, 120 to which the opinion are provided can be grouped based on location of premises or restaurants and users' preferences and only the user terminals included in the group can receive the opinions. Alternatively, the management server 300 can send the opinion to all user terminals.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A system for providing a product ordering service to a user premises, the system comprising:
    an application service provider located outside the user premises and in communication with a management server, the application service provider operable to provide an application service and product data to a user terminal via the management server, a gateway device, and a digital media adapter, wherein the application service has a list of functions that are only accessible by providing a security credential;
    the management server located outside the user premises and in communication with the gateway device via a wide area network and operable to control transporting and storing of the product data and downloading and enabling the application service from the application service provider, the management server including an order management module operable to handle a product order received from the user terminal and a registration and billing module operable to authenticate registration of the application service provider and the user terminal and handle billing with regard to the product order from the user terminal, wherein if the application service provider is unable to authenticate registration with the management server the application service provider is prevented from communicating with the user terminal by the management server;
    the user terminal at the user premises having or driving a display device;
    the digital media adapter at the user premises coupled to the user terminal and operable to present the product data to the user terminal;
    the gateway device physically separated from the digital media adapter and the user terminal in the user premises, the gateway device coupled for communication with the digital media adapter and the user terminal via a local area network, and for communication with the wide area network outside the user premises, whereby the gateway provides a user-interactive product ordering service within the user premises via the display device, the gateway device being configured for obtaining and storing the product data via the wide area network and providing the product data to the digital media adapter to be displayed on the display device, wherein upon a user request for the product data the gateway device searches the stored product data stored in the gateway device and provides the requested product data to the digital media adapter for display on the display device, wherein, upon a placement of the product order by a user input through the user terminal based on the product data, the gateway device sends an order message via the wide area network to the application service provider, the gateway device comprising:
        an application service manager operable to serve as a message broker by providing services that coordinate communication between the application service provider, the management server, the digital media adapter, and the user terminal, the application service manager comprising:
            a configuration manager library that stores configuration parameters for the application service provided by the application service provider, the configuration manager library operable to receive the configuration parameters from the management server, the configuration parameters include an application service provider identifier that identifies the application service provider, the security credential that enables the application service manager to allow the user terminal to access the list of functions of the application service, and a list of media types supported by the application service, wherein the application service manager prevents the user terminal from accessing the list of functions of the application service when the user terminal is without the security credential;
            an alarm interface operable to generate an alarm message and send a process shutdown request to a platform manager within the gateway device if the configuration parameters received from the management server are non-compliant with the capabilities of the gateway device;
            a client library manager operable to communicate with the application service provider to obtain the application service and operable to store the application service and the product data;
            a download manager operable to manage downloading of the application service from the application service provider; and
            a storage manager operable to provide buffering time used by the gateway device while streaming the application service to the user terminal,
        a web server coupled to the application service manager and operable to receive an application request from the digital media adapter, the web server operable to send the application request to the application service manager which invokes an application programming interface to send the application request to the application service provider which provides the requested application service to the web server, the web server operable to send the requested application to the digital media adapter;

an event manager coupled to the application service manager and operable to log events and publish events from the application service provider; and a network device manager coupled to the application service manager and operable to manage network devices coupled to the gateway device including the user terminal and the digital media adapter.

2. The system of claim 1 wherein the management server communicates with the gateway device for authenticating the user terminal and the application service provider with the management server and for obtaining the product data from the application service provider and sending the product data to the gateway device.

3. The system of claim 1, wherein the product data comprises categorized lists of products for selective output via the display device based on selected criteria.

4. The system of claim 1, wherein the gateway device stores address data of the user premises and sends the address data with the order message to the application service provider to provide a direction to the user premises for use in delivery of the product.

5. The system of claim 1, wherein the digital media adapter is operable for converting digital data between a format used by the gateway device and a signal format for a TV type display device.

6. The system of claim 1, wherein the application service manager further comprises an application programming interface (API) to allow the application service provided on the wide area network to access the user terminal, the application service being managed from the management server, communications processed through the API including receiving product data and sending the order messages.

7. The system of claim 1,
wherein the management server is configured to integrate billing for the ordered product with billing for providing the product ordering service at the premises.

8. The system of claim 1, wherein:
the user terminal is configured as a client for purposes of product ordering service; and
the gateway is configured as a server communicating with the client, for purposes of the product order service.

9. A method for providing a product ordering service to a user premises having a gateway device coupled for communication with a user terminal via a local area network in the premise and for communication with a wide area network outside the premises, the method comprising steps of:

providing a management server located outside the user premises and in communication with the gateway device via the wide area network and operable to control transporting and storing of product data and downloading and enabling an application service from an application service provider, the management server including a registration module operable to authenticate registration of the application service provider such that if the application service provider is unable to authenticate registration with the management server the application service provider is prevented from communicating with the user terminal by the management server;

providing the gateway device in the user premises and coupled for communication with a digital media adapter and the user terminal via the local area network, the gateway device comprising:

an application service manager operable to serve as a message broker by providing services that coordinate communication between the application service provider, the management server, the digital media adapter, and the user terminal, the application service manager comprising:

a configuration manager library that stores configuration parameters for the application service provided by the application service provider, the configuration manager library operable to receive the configuration parameters from the management server, the configuration parameters include an application service provider identifier that identifies the application service provider, a security credential that enables the application service manager to allow the user terminal to access a list of functions of the application service, and a list of media types supported by the application service, wherein the application service manager prevents the user terminal from accessing the list of functions of the application service when the user terminal is without the security credential;

an alarm interface operable to generate an alarm message and send a process shutdown request to a platform manager within the gateway device if the configuration parameters received from the management server are non-compliant with the capabilities of the gateway device;

a client library manager operable to communicate with the application service provider to obtain the application service and operable to store the application service and the product data;

a download manager operable to manage downloading of the application service from the application service provider; and a storage manager operable to provide buffering time used by the gateway device while streaming the application service to the user terminal, a web server coupled to the application service manager and operable to receive an application request from the digital media adapter, the web server operable to send the application request to the application service manager which invokes an application programming interface to send the application request to the application service provider which provides the requested application service to the web server, the web server operable to send the requested application to the digital media adapter;

an event manager coupled to the application service manager and operable to log events and publish events from the application service provider; and a network device manager coupled to the application service manager and operable to manage network devices coupled to the gateway device including the user terminal and the digital media adapter;

storing at the gateway device product data;

providing the digital media adapter at the premises coupled to the user terminal and the gateway device, the digital media adapter operable to present the product data to the user terminal, the digital media adapter being a separate device from the user terminal and the gateway device;

receiving an initial user request for the product data at the gateway device;

searching, by the gateway device, the stored product data;

displaying the stored product data from the gateway on the user terminal via an interactive graphical user interface whereupon the user inputs an order request for a product based on the stored product data;

receiving the order request of a product from the terminal via the digital media adapter at the gateway device; and sending the order request to the application service provider of the ordered product together with terminal user's data, via the wide area network.

10. The method of claim 9, further comprising:

authenticating the user terminal and the application service provider with the management server by the management server; and obtaining the product data at the management server from the application service provider and sending the product data to the gateway device.

11. The method of claim 9, wherein sending the order request to the application service provider of the ordered product together with terminal user's data comprises the steps of:

sending the order request as well as address data of the premises stored in the gateway device to the management server;

forwarding the order request and the address data to the application service provider from the management server.

12. The method of claim 9, further comprises the steps of:

gathering product data and application service provider data at the management server;

categorizing product data and application service provider data based on types and price of the products and location of the products; and sending categorized product data and application service provider data to the gateway at a predetermined time.

13. The method of claim 9, further comprising steps of:

receiving a notification relating to status of processing the order in the management server from the application service provider;

sending a notification of status of the order to the gateway device based on the notification relating to status of processing the order at the management server; and forwarding the notification from the gateway device to the terminal at the premises for presentation to the user.

14. The method of claim 9, wherein displaying the stored product data from the gateway on the user terminal via interactive graphical user interface comprises the steps of:

receiving payment data of terminal user from the gateway together with the order request; and integrating the payment data for the ordered product on bill data for delivering the product ordering services stored in the service management server.

15. The method of claim 9, wherein receiving the order request of a product from the terminal via the digital media adapter at the gateway device comprises the steps of:

receiving payment data of terminal user at the application service provider from the gateway together with the order request; and charging the price of the ordered product based on the payment data at the application service provider.

16. The method of claim 9, further comprising steps of:

receiving notifications of evaluation for product or application service provider after delivery of the ordered product, from the application service provider.

17. A system for providing a product ordering service to a user premises, the system comprising:

a management server located outside the user premises and in communication with a gateway device via a wide area network and operable to control transporting and storing of product data and downloading and enabling an application service from an application service provider, the management server including an order management module operable to handle a product order received from a user terminal and a registration and billing module operable to authenticate registration of the application service provider and the user terminal and handle billing with regard to the product order from the user terminal, wherein if the application service provider is unable to authenticate registration with the management server the application service provider is prevented from communicating with the user terminal by the management server;

the user terminal at the user premises coupled to a display device;

the digital media adapter at the user premises coupled to the user terminal and operable to present the product data to the user terminal;

the gateway device in the user premises, the gateway device coupled for communication with the digital media adapter and the user terminal via a local area network, the gateway device coupled for communication with the management server and the application service provider via the wide area network, the gateway device operable to provide a user-interactive product ordering service within the user premises via the display device, the gateway device being configured for obtaining and storing the product data via the wide area network from one of the management server and the application service provider and providing the product data to the digital media adapter to be displayed on the display device, the gateway device comprising:

an application service manager operable to serve as a message broker by providing services that coordinate communication between the application service provider, the management server, the digital media adapter, and the user terminal, the application service manager comprising:

a configuration manager library that stores configuration parameters for the application service provided by the application service provider, the configuration manager library operable to receive the configuration parameters from the management server, the configuration parameters include an application service provider identifier that identifies the application service provider, a security credential that enables the application service manager to allow the user terminal to access a list of functions of the application service, and a list of media types supported by the application service, wherein the application service manager prevents the user terminal from accessing the list of functions of the application service when the user terminal is without the security credential;

an alarm interface operable to generate an alarm message and send a process shutdown request to a platform manager within the gateway device if the configuration parameters received from the management server are non-compliant with the capabilities of the gateway device;

a client library manager operable to communicate with the application service provider to obtain the application service and operable to store the application service and the product data;

a download manager operable to manage downloading of the application service from the application service provider; and a storage manager operable to provide buffering time used by the gateway device while streaming the application service to the user terminal, a web server coupled to the application service manager and operable to receive an application request from the digital media adapter, the web server operable to send the application request to the application service manager which invokes an application programming interface to send the application request to the application service provider which provides the requested application service to the web server, the web server operable to send the requested application to the digital media adapter;

an event manager coupled to the application service manager and operable to log events and publish events from the application service provider; and a network device manager coupled to the application service manager and operable to manage network devices coupled to the gateway device including the user terminal and the digital media adapter, wherein upon a user request for a specific product data the gateway device searches product data stored in the gateway device to determine whether the stored product data contains the specific product data and if the stored product contains the specific product data then the gateway device provides the specific product data from the stored product data to the digital media adapter for display on the display device, wherein if the stored product data does not contain the specific product data then the gateway device requests the specific product data from the management server and if the management server has the specific product data then the management server provides the specific product data to the gateway device.

18. The system of claim 17, further comprising:
the application service provider located outside the user premises and in communication with the management server, the application service provider operable to provide the application service and product data to the user terminal via the management server, the gateway device, and the digital media adapter.

19. The system of claim 17, wherein upon a placement of the product order by a user input through the user terminal based on the product data, the gateway device sends an order message via the wide area network to the application service provider,
wherein the gateway device stores address data of the user premises and sends the address data with the order message to the application service provider to provide a direction to the user premises for use in delivery of the product.

20. The system of claim 17, wherein the management server communicates with the gateway device for authenticating the user terminal and the application service provider with the management server and for obtaining the product data from the application service provider and sending the product data to the gateway device.

21. The system of claim 17, wherein the product data comprises categorized lists of products for selective output via the display device based on selected criteria.

22. The system of claim 17, wherein the digital media adapter is operable for converting digital data between a format used by the gateway device and a signal format for a TV type display device.

23. The system of claim 17, wherein the application service manager further comprises an application programming interface (API) to allow the application service provided on the wide area network to access the user terminal, the application service being managed from the management server, communications processed through the API including receiving the product data and the application service.

24. The system of claim 17, wherein:
the user terminal is configured as a client for purposes of product ordering service; and
the gateway is configured as a server communicating with the client, for purposes of the product order service.

25. The system of claim 17, wherein if the stored product data does not contain the specific product data and the management server does not have the specific product data then the management server obtains the specific product data from the application service provider and provides the specific product data to the gateway device.

* * * * *